US009593957B2

(12) United States Patent
Zheng et al.

(10) Patent No.: US 9,593,957 B2
(45) Date of Patent: Mar. 14, 2017

(54) SEARCHING SIMILAR TRAJECTORIES BY LOCATIONS

(75) Inventors: Yu Zheng, Beijing (CN); Zaiben Chen, Brisbane (AU); Xing Xie, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 433 days.

(21) Appl. No.: 12/794,538

(22) Filed: Jun. 4, 2010

(65) Prior Publication Data

US 2011/0301832 A1   Dec. 8, 2011

(51) Int. Cl.
| G01C 21/00 | (2006.01) |
| G01C 21/34 | (2006.01) |
| G01C 21/26 | (2006.01) |
| G01C 21/36 | (2006.01) |

(52) U.S. Cl.
CPC ......... *G01C 21/3484* (2013.01); *G01C 21/26* (2013.01); *G01C 21/3667* (2013.01)

(58) Field of Classification Search
USPC ........................................ 701/200, 400, 410
See application file for complete search history.

(56) References Cited

U.S. PATENT DOCUMENTS

| 5,428,546 A | 6/1995 | Shah et al. |
| 5,802,492 A | 9/1998 | DeLorme et al. |
| 5,845,227 A | 12/1998 | Peterson |
| 5,904,727 A | 5/1999 | Prabhakaran |
| 6,023,241 A | 2/2000 | Clapper |
| 6,091,359 A | 7/2000 | Geier |

(Continued)

FOREIGN PATENT DOCUMENTS

| EP | 1087605 A2 | 3/2001 |
| GB | 2421653 | 6/2006 |

(Continued)

OTHER PUBLICATIONS

Borzsonyi, et al., The Skyline Operator, In Proc. ICDE 2001, IEEE Press: 421-430, <<http://ieeexplore.ieee.org/stamp/stamp.jsp?tp=&arnumber=914855>>.

(Continued)

*Primary Examiner* — Ryan Zeender
*Assistant Examiner* — Christopher Buchanan
(74) *Attorney, Agent, or Firm* — Sandy Swain; Micky Minhas; Lee & Hayes, PLLC

(57) ABSTRACT

Techniques for providing a trajectory route to multiple geographical locations of interest are described. This disclosure describes receiving global position system (GPS) logs associated with respective individual devices, each of the GPS logs including trajectories connecting a set of geographical locations previously visited by an individual of a respective individual device. A trajectory route service receives a request for a trajectory connecting a set of geographical locations of interest specified by a user. The trajectory route service calculates a proximal similarity between (1) the set of geographical locations of interest specified by the user, and (2) respective sets of geographical locations from the GPS logs. The trajectory route service constructs the requested trajectory with use of at least one of the trajectories from the GPS logs determined at least in part according to the calculated proximal similarities.

20 Claims, 11 Drawing Sheets

(56) References Cited

U.S. PATENT DOCUMENTS

| | | |
|---|---|---|
| 6,091,956 A | 7/2000 | Hollenberg |
| 6,122,628 A | 9/2000 | Castelli et al. |
| 6,128,279 A | 10/2000 | O'Neil et al. |
| 6,219,662 B1 | 4/2001 | Fuh et al. |
| 6,243,647 B1 | 6/2001 | Berstis et al. |
| 6,317,684 B1 | 11/2001 | Roeseler et al. |
| 6,317,686 B1 | 11/2001 | Ran |
| 6,351,775 B1 | 2/2002 | Yu |
| 6,356,838 B1 | 3/2002 | Paul |
| 6,385,539 B1 | 5/2002 | Wilson et al. |
| 6,411,897 B1 | 6/2002 | Gaspard, II |
| 6,424,370 B1 | 7/2002 | Courtney |
| 6,427,122 B1 | 7/2002 | Lin |
| 6,430,547 B1 | 8/2002 | Busche et al. |
| 6,446,121 B1 | 9/2002 | Shah et al. |
| 6,493,650 B1 | 12/2002 | Rodgers et al. |
| 6,496,814 B1 | 12/2002 | Busche |
| 6,513,026 B1 | 1/2003 | Horvitz et al. |
| 6,516,272 B2 | 2/2003 | Lin |
| 6,553,310 B1 | 4/2003 | Lopke |
| 6,584,401 B2 | 6/2003 | Kirshenbaum et al. |
| 6,606,643 B1 | 8/2003 | Emens et al. |
| 6,611,881 B1 | 8/2003 | Gottfurcht et al. |
| 6,615,130 B2 | 9/2003 | Myr |
| 6,618,507 B1 | 9/2003 | Divakaran et al. |
| 6,625,319 B1 | 9/2003 | Krishnamachari |
| 6,724,733 B1 | 4/2004 | Schuba et al. |
| 6,732,120 B1 | 5/2004 | Du |
| 6,785,704 B1 | 8/2004 | McCanne |
| 6,816,779 B2 | 11/2004 | Chen et al. |
| RE38,724 E | 4/2005 | Peterson |
| 6,904,160 B2 | 6/2005 | Burgess |
| 6,919,842 B2 | 7/2005 | Cho |
| 6,925,447 B2 | 8/2005 | McMenimen et al. |
| 6,965,827 B1 | 11/2005 | Wolfson |
| 6,970,884 B2 | 11/2005 | Aggarwal |
| 6,981,055 B1 | 12/2005 | Ahuja et al. |
| 7,003,555 B1 | 2/2006 | Jungck |
| 7,013,290 B2 | 3/2006 | Ananian |
| 7,013,517 B2 | 3/2006 | Kropf |
| 7,031,517 B1 | 4/2006 | Le et al. |
| 7,062,562 B1 | 6/2006 | Baker et al. |
| 7,111,061 B2 | 9/2006 | Leighton et al. |
| 7,136,932 B1 | 11/2006 | Schneider |
| 7,152,118 B2 | 12/2006 | Anderson, IV et al. |
| 7,155,456 B2 | 12/2006 | Abbott, III et al. |
| 7,171,415 B2 | 1/2007 | Kan et al. |
| 7,194,552 B1 | 3/2007 | Schneider |
| 7,197,500 B1 | 3/2007 | Israni et al. |
| 7,203,693 B2 | 4/2007 | Carlbom et al. |
| 7,219,067 B1 | 5/2007 | McMullen et al. |
| 7,228,359 B1 | 6/2007 | Monteiro |
| 7,233,861 B2 | 6/2007 | Van Buer et al. |
| 7,239,962 B2 | 7/2007 | Plutowski |
| 7,281,199 B1 | 10/2007 | Nicol et al. |
| 7,284,051 B1 | 10/2007 | Okano et al. |
| 7,349,768 B2 | 3/2008 | Bruce et al. |
| 7,366,726 B2 | 4/2008 | Bellamy et al. |
| 7,389,283 B2 | 6/2008 | Adler |
| 7,395,250 B1 | 7/2008 | Aggarwal et al. |
| 7,428,551 B2 | 9/2008 | Luo et al. |
| 7,437,239 B2 | 10/2008 | Serre |
| 7,437,372 B2 | 10/2008 | Chen et al. |
| 7,447,588 B1 | 11/2008 | Xu et al. |
| 7,479,897 B2 | 1/2009 | Gertsch et al. |
| 7,493,294 B2 | 2/2009 | Flinn et al. |
| 7,519,690 B1 | 4/2009 | Barrow et al. |
| 7,548,936 B2 | 6/2009 | Liu et al. |
| 7,561,959 B2 | 7/2009 | Hopkins et al. |
| 7,574,508 B1 | 8/2009 | Kommula |
| 7,584,159 B1 | 9/2009 | Chakrabarti et al. |
| 7,584,301 B1 | 9/2009 | Joshi |
| 7,603,233 B2 | 10/2009 | Tashiro |
| 7,610,151 B2 | 10/2009 | Letchner et al. |
| 7,660,441 B2 | 2/2010 | Chen et al. |
| 7,685,422 B2 | 3/2010 | Isozaki et al. |
| 7,706,964 B2 | 4/2010 | Horvitz et al. |
| 7,707,314 B2 | 4/2010 | McCarthy et al. |
| 7,710,984 B2 | 5/2010 | Dunk |
| 7,739,040 B2 | 6/2010 | Horvitz |
| 7,801,842 B2 | 9/2010 | Dalton |
| 7,840,407 B2 | 11/2010 | Strope et al. |
| 7,860,891 B2 | 12/2010 | Adler et al. |
| 7,904,530 B2 | 3/2011 | Partridge et al. |
| 7,920,965 B1 | 4/2011 | Nesbitt et al. |
| 7,930,427 B2 | 4/2011 | Josefsberg et al. |
| 7,948,400 B2 | 5/2011 | Horvitz et al. |
| 7,982,635 B2 | 7/2011 | Seong |
| 7,984,006 B2 | 7/2011 | Price |
| 7,991,879 B2 | 8/2011 | Josefsberg et al. |
| 8,060,462 B2 | 11/2011 | Flinn et al. |
| 8,117,138 B2 | 2/2012 | Apte et al. |
| 8,135,505 B2 | 3/2012 | Vengroff et al. |
| 8,190,649 B2 | 5/2012 | Bailly |
| 8,219,112 B1 | 7/2012 | Youssef et al. |
| 8,275,649 B2 | 9/2012 | Zheng et al. |
| 8,458,298 B2 | 6/2013 | Josefsberg et al. |
| 8,562,439 B2 | 10/2013 | Shuman et al. |
| 8,577,380 B2 | 11/2013 | Frias Martinez et al. |
| 9,009,177 B2 | 4/2015 | Zheng et al. |
| 2001/0029425 A1 | 10/2001 | Myr |
| 2002/0032689 A1 | 3/2002 | Abbott, III et al. |
| 2002/0038360 A1 | 3/2002 | Andrews et al. |
| 2002/0044690 A1 | 4/2002 | Burgess |
| 2002/0052873 A1 | 5/2002 | Delgado et al. |
| 2002/0062193 A1 | 5/2002 | Lin |
| 2002/0077749 A1 | 6/2002 | Doi |
| 2002/0128768 A1 | 9/2002 | Nakano et al. |
| 2003/0053424 A1 | 3/2003 | Krishnamurthy et al. |
| 2003/0063133 A1 | 4/2003 | Foote et al. |
| 2003/0069893 A1 | 4/2003 | Kanai et al. |
| 2003/0069968 A1 | 4/2003 | O'Neil et al. |
| 2003/0139898 A1 | 7/2003 | Miller et al. |
| 2003/0140040 A1 | 7/2003 | Schiller |
| 2003/0195810 A1 | 10/2003 | Raghupathy et al. |
| 2003/0212689 A1 | 11/2003 | Chen et al. |
| 2003/0217070 A1 | 11/2003 | Gotoh et al. |
| 2003/0229697 A1 | 12/2003 | Borella |
| 2004/0039798 A1 | 2/2004 | Hotz et al. |
| 2004/0064338 A1 | 4/2004 | Shiota et al. |
| 2004/0073640 A1 | 4/2004 | Martin et al. |
| 2004/0117358 A1 | 6/2004 | von Kaenel et al. |
| 2004/0196161 A1 | 10/2004 | Bell et al. |
| 2004/0198386 A1 | 10/2004 | Dupray |
| 2004/0217884 A1 | 11/2004 | Samadani et al. |
| 2004/0220965 A1 | 11/2004 | Harville et al. |
| 2004/0264465 A1 | 12/2004 | Dunk |
| 2005/0004830 A1 | 1/2005 | Rozell et al. |
| 2005/0004903 A1 | 1/2005 | Tsuda |
| 2005/0031296 A1 | 2/2005 | Grosvenor |
| 2005/0075116 A1 | 4/2005 | Laird et al. |
| 2005/0075119 A1* | 4/2005 | Sheha et al. ............... 455/456.6 |
| 2005/0075782 A1 | 4/2005 | Torgunrud |
| 2005/0075784 A1 | 4/2005 | Gray et al. |
| 2005/0080554 A1 | 4/2005 | Ono et al. |
| 2005/0108261 A1 | 5/2005 | Glassy et al. |
| 2005/0131889 A1 | 6/2005 | Bennett et al. |
| 2005/0198286 A1 | 9/2005 | Xu et al. |
| 2005/0203927 A1 | 9/2005 | Sull et al. |
| 2005/0225678 A1 | 10/2005 | Zisserman et al. |
| 2005/0231394 A1 | 10/2005 | Machii et al. |
| 2005/0265317 A1 | 12/2005 | Reeves et al. |
| 2005/0278371 A1 | 12/2005 | Funk et al. |
| 2006/0020597 A1 | 1/2006 | Keating et al. |
| 2006/0036630 A1 | 2/2006 | Gray |
| 2006/0042483 A1 | 3/2006 | Work et al. |
| 2006/0075139 A1 | 4/2006 | Jungck |
| 2006/0085177 A1 | 4/2006 | Toyama et al. |
| 2006/0085419 A1 | 4/2006 | Rosen |
| 2006/0090122 A1 | 4/2006 | Pyhalammi et al. |
| 2006/0095540 A1 | 5/2006 | Anderson et al. |
| 2006/0101377 A1 | 5/2006 | Toyama et al. |
| 2006/0129675 A1 | 6/2006 | Zimmer et al. |
| 2006/0143442 A1 | 6/2006 | Smith |

(56) References Cited

U.S. PATENT DOCUMENTS

| | | |
|---|---|---|
| 2006/0149464 A1 | 7/2006 | Chien |
| 2006/0155464 A1 | 7/2006 | Smartt |
| 2006/0156209 A1 | 7/2006 | Matsuura et al. |
| 2006/0161560 A1 | 7/2006 | Khandelwal et al. |
| 2006/0164238 A1 | 7/2006 | Karaoguz et al. |
| 2006/0173838 A1 | 8/2006 | Garg et al. |
| 2006/0178807 A1 | 8/2006 | Kato et al. |
| 2006/0190602 A1 | 8/2006 | Canali et al. |
| 2006/0200539 A1 | 9/2006 | Kappler et al. |
| 2006/0212217 A1 | 9/2006 | Sheha et al. |
| 2006/0224303 A1 | 10/2006 | Hayashi |
| 2006/0224773 A1 | 10/2006 | Degenaro et al. |
| 2006/0247844 A1 | 11/2006 | Wang et al. |
| 2006/0251292 A1 | 11/2006 | Gokturk et al. |
| 2006/0265125 A1 | 11/2006 | Glaza |
| 2006/0266830 A1 | 11/2006 | Horozov et al. |
| 2007/0005419 A1 | 1/2007 | Horvitz et al. |
| 2007/0006098 A1 | 1/2007 | Krumm et al. |
| 2007/0016663 A1 | 1/2007 | Weis |
| 2007/0038362 A1 | 2/2007 | Gueziec |
| 2007/0041393 A1 | 2/2007 | Westhead et al. |
| 2007/0064633 A1 | 3/2007 | Fricke |
| 2007/0064715 A1 | 3/2007 | Lloyd et al. |
| 2007/0088974 A1 | 4/2007 | Chandwani et al. |
| 2007/0100776 A1 | 5/2007 | Shah et al. |
| 2007/0118668 A1 | 5/2007 | McCarthy et al. |
| 2007/0127833 A1 | 6/2007 | Singh |
| 2007/0168208 A1 | 7/2007 | Aikas et al. |
| 2007/0203638 A1 | 8/2007 | Tooyama et al. |
| 2007/0226004 A1 | 9/2007 | Harrison |
| 2008/0004789 A1 | 1/2008 | Horvitz et al. |
| 2008/0004793 A1 | 1/2008 | Horvitz et al. |
| 2008/0016051 A1 | 1/2008 | Schiller |
| 2008/0016233 A1 | 1/2008 | Schneider |
| 2008/0052303 A1 | 2/2008 | Adler et al. |
| 2008/0059576 A1 | 3/2008 | Liu et al. |
| 2008/0071465 A1* | 3/2008 | Chapman et al. ............ 701/117 |
| 2008/0076451 A1 | 3/2008 | Sheha et al. |
| 2008/0086574 A1 | 4/2008 | Raciborski et al. |
| 2008/0098313 A1 | 4/2008 | Pollack |
| 2008/0201074 A1 | 8/2008 | Bleckman et al. |
| 2008/0201102 A1 | 8/2008 | Boettcher et al. |
| 2008/0214157 A1 | 9/2008 | Ramer et al. |
| 2008/0215237 A1 | 9/2008 | Perry |
| 2008/0228396 A1 | 9/2008 | Machii et al. |
| 2008/0228783 A1 | 9/2008 | Moffat |
| 2008/0235383 A1 | 9/2008 | Schneider |
| 2008/0268876 A1 | 10/2008 | Gelfand et al. |
| 2008/0270019 A1 | 10/2008 | Anderson et al. |
| 2008/0312822 A1* | 12/2008 | Lucas et al. ............ 701/204 |
| 2008/0319648 A1 | 12/2008 | Poltorak |
| 2008/0319660 A1 | 12/2008 | Horvitz et al. |
| 2008/0319974 A1 | 12/2008 | Ma et al. |
| 2009/0005987 A1* | 1/2009 | Vengroff et al. ............ 701/300 |
| 2009/0019181 A1 | 1/2009 | Fang et al. |
| 2009/0063646 A1 | 3/2009 | Mitnick |
| 2009/0070035 A1 | 3/2009 | Van Buer |
| 2009/0083128 A1 | 3/2009 | Siegel |
| 2009/0083237 A1 | 3/2009 | Gelfand et al. |
| 2009/0100018 A1 | 4/2009 | Roberts |
| 2009/0138188 A1 | 5/2009 | Kores et al. |
| 2009/0164516 A1 | 6/2009 | Svendsen et al. |
| 2009/0213844 A1 | 8/2009 | Hughston |
| 2009/0216435 A1 | 8/2009 | Zheng et al. |
| 2009/0216704 A1 | 8/2009 | Zheng et al. |
| 2009/0222581 A1 | 9/2009 | Josefsberg et al. |
| 2009/0228198 A1 | 9/2009 | Goldberg et al. |
| 2009/0239552 A1 | 9/2009 | Churchill et al. |
| 2009/0282122 A1 | 11/2009 | Patel et al. |
| 2009/0326802 A1 | 12/2009 | Johnson |
| 2010/0004997 A1 | 1/2010 | Mehta et al. |
| 2010/0010991 A1 | 1/2010 | Joshi |
| 2010/0027527 A1* | 2/2010 | Higgins et al. ............ 370/351 |
| 2010/0070171 A1 | 3/2010 | Barbeau et al. |
| 2010/0076968 A1 | 3/2010 | Boyns et al. |
| 2010/0082611 A1 | 4/2010 | Athsani et al. |
| 2010/0111372 A1 | 5/2010 | Zheng et al. |
| 2010/0153292 A1 | 6/2010 | Zheng et al. |
| 2010/0279616 A1 | 11/2010 | Jin et al. |
| 2010/0312461 A1 | 12/2010 | Haynie et al. |
| 2011/0022299 A1 | 1/2011 | Feng et al. |
| 2011/0029224 A1 | 2/2011 | Chapman et al. |
| 2011/0130947 A1 | 6/2011 | Basir |
| 2011/0173015 A1 | 7/2011 | Chapman et al. |
| 2011/0176000 A1 | 7/2011 | Budge et al. |
| 2011/0184949 A1 | 7/2011 | Luo |
| 2011/0191011 A1 | 8/2011 | McBride et al. |
| 2011/0191284 A1 | 8/2011 | Dalton |
| 2011/0208419 A1 | 8/2011 | Boss et al. |
| 2011/0280453 A1 | 11/2011 | Chen et al. |
| 2011/0282798 A1 | 11/2011 | Zheng et al. |
| 2011/0302209 A1 | 12/2011 | Flinn et al. |
| 2012/0030029 A1 | 2/2012 | Flinn et al. |
| 2012/0030064 A1 | 2/2012 | Flinn et al. |
| 2012/0150425 A1 | 6/2012 | Chapman et al. |
| 2012/0256770 A1 | 10/2012 | Mitchell |
| 2013/0166188 A1 | 6/2013 | Zheng et al. |
| 2014/0088791 A1 | 3/2014 | Alpert et al. |
| 2015/0117713 A1 | 4/2015 | Zheng et al. |
| 2015/0186389 A1 | 7/2015 | Zheng et al. |

FOREIGN PATENT DOCUMENTS

| | | |
|---|---|---|
| JP | 2002140362 | 5/2002 |
| JP | 2002304408 A | 10/2002 |
| JP | 2003044503 A | 2/2003 |
| KR | 20050072555 A | 7/2005 |
| KR | 20060006271 A | 1/2006 |
| KR | 100650389 B1 | 11/2006 |
| WO | WO2006097907 A2 | 9/2006 |
| WO | WO2007087615 A | 8/2007 |
| WO | WO2007145625 A | 12/2007 |
| WO | WO2009053411 A1 | 4/2009 |

OTHER PUBLICATIONS

Brauckhoff, et al., Applying PCA for Traffic Anomaly Detection: Problems and Solutions, IEEE, 2009, 5 pages.

Brkic, et al., Generative modeling of spatio-temporal traffic sign trajectories, Proceedings of the IEEE Conference on Computer Vision and Pattern Recognition, 2010, pp. 25-31, <<http://www.zemris.fer.hr/~ssegvic/pubs/brkic10ucvp.pdf>>.

Bu, et al., Efficient Anomaly Monitoring Over Moving Object Trajectory Streams, KDD 2009, ACM, 2009, 9 pages.

Chen, et al., GLS-SOD: A Generalized Local Statistical Approach for Spatial Outlier Detection, Proceedings of KDD 2010, ACM, 2010, pp. 1069-1078.

Cranshaw, et al., Bridging the Gap between the Physical Location and Online Social Networks, In Proc. Ubicomp 2010, ACM Press (2010), <<http://www.eng.tau.ac.il/~eran/papers/Cranshaw_Bridging_the_Gap.pdf>>.

Das, et al., Anomaly Detection and Spatial-Temporal Analysis of Global Climate System, Proceedings of SensorKDD 2009, 9 pages, 2009 ACM.

Eagle, et al., Community Computing: Comparisons between Rural and Urban Societies using Mobile Phone Data, IEEE Social Computing, 144-150, <<http://reality.media.mit.edu/pdfs/Eagle_community.pdf>>.

Eagle, et al., Reality mining: sensing complex social systems. Personal Ubiquitous Computing, 10, 4: 255-268, 2006. <<http://robotics.usc.edu/~sameera/CS546/readings/eagle_uc2006.pdf>>.

Estkowski, No Steiner Point Subdivision Simplification is NP-Complete, In Proceedings of the 10th Canadian Conference on Computational Geometry, pp. 11-20, 1998.

Ge, et al., An Energy-Efficient Mobile Recommender System. In Proc. KDD 2010, ACM Press 2010, <<http://pegasus.rutgers.edu/~kelixiao/papers/An%20Energy-Efficient%20Mobile%20Recommender%20System.pdf>>.

Ge, et al., Top-Eye: Top-k Evolving Trajectory Outlier Detection, Proceedings of CIKM 2010, Toronto, Canada, 4 pages.

(56) References Cited

OTHER PUBLICATIONS

Guehnemann, et al., Monitoring traffic and emissions by floating car data. Institute of transport studies Australia; 2004, <<http://elib.dlr.de/6675/1/its_wp_04-07.pdf>>.
Hirose, et al., Network Anomaly Detection based on Eigen Equation Compression, In Proceedings of the 15th SIGKDD Conference on Knowledge Discovery and Data Mining, pp. 1185-1194, 2009 ACM. <<http://www.ibis.t.u-tokyo.ac.jp/yamanishi/ID361_Network_Anomaly_Detection.pdf>>.
Kindberg, et al., Urban computing. Pervasive computing. IEEE Computer Society. 6, 3, pp. 18-20. Aug. 2007, <<http://ieeexplore.ieee.org/stamp/stamp.jsp?tp=&arnumber=4287439&userType=inst>>.
Kostakos, et al., Urban computing to bridge online and real-world social networks. Handbook of Research on Urban Informatics, 2008, <<http://hci.uma.pt/courses/ubicomp/papers/social/kostakos-08.pdf>>.
Lakhina, et al., Diagnosing Network-Wide Traffic Anomalies, In Proceedings of the SIGCOMM 2004 Conference, 12 pages, 2004 ACM.
Lee, et al., Trajectory Clustering: A Partition-and-group Framework, In Proceedings of the 26th ACM SIGMOD International Conference on Management of Data 2007, pp. 593-604, 2007.
Li, et al., Temporal Outlier Detection in Vehicle Traffic Data, Proceedings of the 2009 IEEE International Conference on Data Engineering, pp. 1319-1322, <<http://www.cs.uiuc.edu/~hanj/pdf/icde09_xli.pdf>>.
Liao, et al., Anomaly Detection in GPS Data Based on Visual Analytics, Proceedings of the 2010 IEEE Symposium, Oct. 2010, pp. 51-58, <<http://web.siat.ac.cn/~baoquan/papers/GPSvas.pdf>>.
Lippi, et al., Collective Traffic Forecasting, Proceedings of the European Conference on Machine Learning and Principles and Practice of Knowledge Discovery Database, ECML PKDD 2010, pp. 259-273, 2010.
Liu, et al., Uncovering cabdrivers' behavior patterns from their digital traces, Computers, Environment and Urban Systems, 2010.
Lozano, et al., Spatial-temporal Causal Modeling for Climate Change Attribution, KDD 2009, Paris France, ACM 2009, 10 pages.
Nzouonta, et al, VANET Routing on City Roads using Real-Time Vehicular Traffic Information, IEEE Transactions on Vehicular Technology, vol. 58, No. 7, Sep. 2009, <<http://web.njit.edu/~gwang/publications/TVT09.pdf>>.
Pelekis, et al., Unsupervised Trajectory Sampling, Proceedings of the European Conference on Machine Learning and Principles and Practice of Knowledge Discovery in Databases ECML PKDD 2010, pp. 17-33, 2010.
Ringberg, et al., Sensitivity of PCA for Traffic Anomaly Detection, SIGMETRICS 2007, pp. 109-120.
Rosenfeld, Connectivity in digital pictures. Journal of the ACM (JACM), 17(1):160, 1970.
Rosenfeld, Connectivity in digital pictures, Journal of the ACM 17 (1): pp. 146-160, 1970.
Shekhar, et al., Unified approach to detecting spatial outliers, University of Helsinki 2007, 27 pages, <<http://www.cs.helsinki.fi/u/leino/opetus/spatial-k07/maksimainen.pdf>>.
Shklovski, et al., Urban Computing-Navigating Space and Context. IEEE Computer Society. 39 ,9, pp. 36-37, 2006 <<http://www.itu.dk/people/irsh/pubs/UrbanComputingIntro.pdf>>.
Sun, et al., On Local Spatial Outliers, Technical Report No. 549, Jun. 2004, <<http://sydney.edu.au/engineering/it/research/tr/tr549.pdf>>, 9 pages.
Wu, et al., Spatio-Temporal Outlier Detection in Precipitation Data, Knowledge Discovery from Sensor Data, pp. 115-133, 2010, <<http://sydney.edu.au/engineering/it/~ewu1/publications/WuLiuChawlaSensorKDD2008.pdf>>.
Yan, et al., Discovery of frequent substructures, Wiley-Interscience, 2007, 99-113.
Yuxiang, et al., Detecting Spatio-temporal Outliers in Climate Dataset: A Method Study, IEEE 2005, pp. 760-763.
Zhang, et al., iBAT: Detecting Anomalous Taxi Trajectories from GPS Traces, Proceedings of UbiComp Sep. 2011, 10 pages.
Zhang, et al., Network Anomography, USENIX Association, Internet Measurement Conference 2005, pp. 317-330.
Zheng, et al., GeoLife: A Collaborative Social Networking Service among User, Location and Trajectory. IEEE Date Engineer Bulletin, 33(2). IEEE press 2010, 32-40, <<http://sites.computer.org/debull/A10june/geolife.pdf>>.
Zheng, et al., Recommending friends and locations based on individual location history. In ACM Transaction on the Web, 2011, 44 pages, <<http://research.microsoft.com/pubs/122435/RecomFriend-zheng-Published.pdf>>.
Zheng, et al., T-Drive: Driving Directions based on Taxi Trajectories, In Proc. ACM SIGSPATIAL GIS 2010. ACM Press , 2010, 10 pages, <<http://www.cse.unt.edu/~huangyan/6350/paperList/T-Drive.pdf>>.
Ziebart, et al., Navigate like a cabbie: Probabilistic reasoning from observed context-aware behavior. In Proc. Ubicomp 2008, pp. 322-331, <<http://citeseerx.ist.psu.edu/viewdoc/download?doi=10.1.1.141.7187&rep=rep1&type=pdf>>.
Min-qi, et al., "An Algorithm for Spatial Outlier Detection Based on Delaunay Triangulation", In the Proceedings of the 2008 International Conference on Computational Intelligence and Security, Dec. 2008, pp. 102-107.
Office Action for U.S. Appl. No. 12/353,940, mailed on Mar. 23, 2012, Yu Zheng, "Detecting Spatial Outliers in a Location Entity Dataset", 6 pgs.
Office Action for U.S. Appl. No. 12/773,771, mailed on Mar. 26, 2012, Yu Zheng, "Collaborative Location and Activity Recommendations", 9 pgs.
Office Action for U.S. Appl. No. 12/711,130, mailed on Mar. 27, 2012, Yu Zheng, "Mining Correlation Between Locations Using Location History", 14 pgs.
Office Action for U.S. Appl. No. 12/567,667, mailed on Jul. 18, 2012, Zheng et al., "Recommending Points of Interests in a Region", 20 pages.
Office Action for U.S. Appl. No. 12/712,053, mailed on Aug. 15, 2012, Zheng et al., "Route Computation Based on Route-Oriented Vehicle Trajectories", 17 pages.
Shekhar, et al., "Data Mining for Selective Visualization of Large Spatial Datasets", In the Proceedings of the 14th IEEE International Conference on Tools with Artificial Intelligence, Nov. 2002, pp. 41-48.
Zhang, et al., "A Taxonomy Framework for Unsupervised Outlier Detection Techniques for Multi-Type Data Sets," Technical Report TR-CTIT-07-79, Centre for Telematics and Information Technology University of Twente, Enschede, Nov. 2007, pp. 1-40.
Office Action for U.S. Appl. No. 12/037,347, mailed on Aug. 17, 2011, Yu Zheng, "System for Logging Life Experiences Using Geographic Cues", 9 pgs.
Belussi, Faloutsos, "Estimating the Selectivity of Spatial Queries Using the 'Correlation' Fractal Dimension", retrieved on Apr. 15, 2010 at <<http://www.vldb.org/conf/1995/P299.PDF>>, Proceedings of Conference on Very Large Data Bases (VLDB), 1995, pp. 299-310.
"Bikely", retrieved on Apr. 15, 2010 at <<http://www.bikely.com/>>, 2010, pp. 1.
Bohm, "A Cost Model for Query Processing in High Dimensional Data Spaces", retrieved on Apr. 15, 2010 at <<http://www.dbs.informatik.uni-muenchen.de/~boehm/publications/tods-modeling.final.pdf>>, ACM Transactions on Database Systems, 2000, pp. 1-43.
Cai, Ng, "Indexing Spatio-Temporal Trajectories with Chebyshev Polynomials", retrieved on Apr. 15, 2010 at <<http://www.cs.ubc.ca/~rng/psdepository/sigmod2004.pdf>>, ACM, Conference on Management of Data, Jun. 13, 2004, pp. 599-610.
Chan, Fu, "Efficient Time Series Matching by Wavelets", retrieved on Apr. 15, 2010 at <<http://infolab.usc.edu/csci599/Fall2003/Time%20Series/Efficient%20Time%20Series%20Matching%20by%20Wavelets.pdf>>, IEEE Computer Society, Proceedings of Conference on Data Engineering (ICDE), 1999, pp. 126-133.
Chen, Ng, "On the Marriage of Lp-norms and Edit Distance", retrieved on Apr. 15, 2010 at <<http://www.google.co.in/url?sa=t

(56) References Cited

OTHER PUBLICATIONS

&source=web&ct=res&cd=3&ved=0CBEQFjAC&
url=http%3A%2F%2Fciteseerx.ist.psu.
edu%2Fviewdoc%2Fdownload%3Fdoi%3D10.1.1.1.
7443%26rep%3Drep1%26type%3Dpdf&rct=j&
q=On+the+marriage+of+lp-norms+and+edit+distance&ei=_
ezGS62IE439_Aa1qlzZDA&usg=AFQjCNHFZScVkE4uy1b_
oC-Pr4ur7KIBdQ>>, Proceedings of Conference on Very Large Data Bases (VLDB), 2004, pp. 792-803.
Chen, Ozsu, Oria, "Robust and Fast Similarity Search for Moving Object Trajectories", retrieved on Apr. 15, 2010 at <<http://citeseerx.ist.psu.edu/viewdoc/
download;jsessionid=2C0EAC347F5F144727996F29CEFD
49FB?doi=10.1.1.94.8191&rep=rep1&type=pdf>>, ACM, Conference on Management of Data, 2005, pp. 491-502.
Ding, Trajcevski, Scheuermann, Wang, Keogh, "Querying and Mining of Time Series Data: Experimental Comparison of Representations and Distance Measures", retrieved on Apr. 15, 2010 at <<http://www.vldb.org/pvldb/1/1454226.pdf>>, VLDB Endowment, Proceedings of Conference on Very Large Data Bases (VLDB), Aug. 2008, pp. 1542-1552.
Faloutsos, Ranganathan, Manolopoulos, "Fast Subsequence Matching in Time-Series Databases", retrieved on Apr. 15, 2010.
Frentzos, Gratsias, Pelekis, Theodoridis, "Algorithms for Nearest Neighbor Search on Moving Object Trajectories", retrieved on Apr. 15, 2010 at <<http://infolab.cs.unipi.gr/pubs/journals/FGPT06-Geoinformatica.pdf>>, Kluwer Academic Publishers, Geoinformatica, vol. 11, No. 2, 2007, pp. 159-193.
Frentzos, Gratsias,Theodoridis, "Index-based Most Similar Trajectory Search", retrieved on Apr. 15, 2010 at <<http://isl.cs.unipi.gr/pubs/TR/UNPI-ISL-TR-2006-01.pdf>>, IEEE Conference on Data Engineering (Technical Report UNIPI-TR-2006-01), Apr. 15, 2007, pp. 816-825.
"GPS-Waypoints", retrieved on Apr. 15, 2010 at <<http://www.gps-waypoints.net/>>, 2010, pp. 1.
Guttman, "R-Trees: A Dynamic Index Structure for Spatial Searching", retrieved on Apr. 15, 2010 at <<http://www.google.co.in/url?sa=t&source=web&ct=res&cd=1&ved=0CAcQFjAA&
url=http%3A%2F%2Fciteseerx.ist.psu.
edu%2Fviewdoc%2Fdownload%3Fdoi%3D10.1.1.66.
1675%26rep%3Drep1%26type%3Dpdf&rct=j&q=R-trees%3A+a+dynamic+index+structure+for+spatial+searching&
ei=JfTGS6uRPJH0_AaCpICHDQ&
usg=AFQjCNFtQttNVHCKYJQZcH052-KmCxIZ0g>>, ACM, Proceedings of Conference on Management of Data,1984, pp. 47-57.
Hjaltason, Samet, "Distance Browsing in Spatial Databases", retrieved on Apr. 15, 2010 at <<http://citeseerx.ist.psu.edu/viewdoc/download?doi=10.1.1.25.4224&rep=rep1&type=pdf>>, ACM Transactions on Database Systems, vol. 24, No. 2, Jun. 1999, pp. 265-318.
Jan, Horowitz, Peng, "Using GPS Data to Understand Variations in Path Choice", retrieved on Apr. 15, 2010 at <<https://pantherfile.uwm.edu/horowitz/www/pathchoice.pdf>>, National Research Council, Transportation Research Record 1725, 2000, pp. 37-44.
Kharrat, Popa, Zeitouni, Faiz, "Clustering Algorithm for Network Constraint Trajectories", retrieved on Apr. 15, 2010 at <<http://www.prism.uvsq.fr/~karima/papers/SDH_08.pdf>>, Springer Berlin, Symposium on Spatial Data Handling (SDH), 2008, pp. 631-647.
Korn, Pagel, Faloutsos, "On the 'Dimensionality Curse' and the 'Self-Similarity Blessing'", retrieved on Apr. 15, 2010 at <<http://www.informedia.cs.cmu.edu/documents/korn_dimcurse_2001.
pdf>>, IEEE Educational Activities Department, Transactions on Knowledge and Data Engineering, vol. 13, No. 1, Jan. 2001, pp. 96-111.
Morse, Patel, "An Efficient and Accurate Method for Evaluating Time Series Similarity", retrieved on Apr. 15, 2010 at <<http://www.eecs.umich.edu/db/files/sigmod07timeseries.pdf>>, ACM, Proceedings of Conference on Management of Data, Jun. 11, 2007, pp. 569-580.
Pfoser et al., "Novel Approaches in Query Processing for Moving Object Trajectories", Proceedings of the 26th International Conference on Very Large Data Bases (VLDB 2000), Cairo, Egypt, Sep. 10-14, 2000, pp. 395-406.
Roussopoulos, Kelley, Vincent, "Nearest Neighbor Queries", retrieved on Apr. 15, 2010 at <<http://www.cs.umd.edu/~nick/papers/nncolor.pdf>>, ACM, Presentation: Conference on Management of Data, 1995, pp. 1-23.
"Share My Routes", retrieved on Apr. 15, 2010 at <<http://www.sharemyroutes.com/>>, 2010, pp. 1-2.
Sherkat, Rafiei, "On Efficiently Searching Trajectories and Archival Data for Historical Similarities", retrieved on Apr. 15, 2010 at <<http://webdocs.cs.ualberta.ca/~drafiei/papers/vldb08.pdf>>, VLDB Endowment, Proceedings of Conference on Very Large Data Bases (VLDB), vol. 1, No. 1, Aug. 24, 2008, pp. 896-908.
Vlachos, Kollios, Gunopulos, "Discovering Similar Multidimensional Trajectories", retrieved on Apr. 15, 2010 at <<http://www.google.co.in/url?sa=t&source=web&ct=res&cd=1&
ved=0CAcQFjAA&url=http%3A%2F%2Fciteseeerx.ist.psu.
edu%2Fviewdoc%2Fdownload%3Fdoi%3D10.1.1.106.
1984%26rep%3Drep1%26type%3Dpdf&rct=j&
q=Discovering+similar+multidimensional+trajectories&
ei=ivfGS6HCM4uj_ga3wOiBDQ&usg=AFQjCNG20j6K3s_
WuY-VhWeDjIPYpgxv1Q>>, IEEE Computer Society, Proceedings of Conference on Data Engineering (ICDE), 2002, pp. 673-684.
Xie, Zheng, "GeoLife: Building social networks using human location history", retrieved on Apr. 15, 2010 at <<http://research.microsoft.com/en-us/projects/geolife/>>, Microsoft Corporation, 2010, pp. 1-8.
Xue, "Efficient Similarity Search in Sequence Databases", retrieved on Apr. 15, 2010 at <<http://www.cs.uwaterloo.ca/~david/cs848/presentation-similarity-fengxue.pdf>>, University of Waterloo, Ontario Canada, Course Paper: CS 860 Topics in Database Systems, Nov. 18, 2009, pp. 1-7.
Yi, Jagadish, Faloutsos, "Efficient Retrieval of Similar Time Sequences under Time Warping", retrieved on Apr. 15, 2010.
Ahern, et al., "World Explorer: Visualizing Aggregate Data From Unstructured Text in Geo-Referenced Collections", In the Proceedings of the 7th ACM/IEEE-CS Joint Conference on Digital Libraries, 2007, pp. 1-10.
Graham, "GPS Gadgets Can Reveal More Than Your Location", Retrieved on Nov. 28, 2011 at <<http://www.google.com/#sclient=psy-ab&hl=en&source=hp&
q=Graham%2C+GPS+Gadgets+Can+Reveal+More+
Than+Your+Location&pbx=1&
oq=Graham%2C+GPS+Gadgets+Can+Reveal+More+
Than+Your+Location%22%2C+&aq=f&aqi=&aql=&gs_sm=d&
gs_upl=287016708I0I10140I2I2I0I0I0I0I266I438I0.1.1I2I0&
bay=on.2,or.r_gc.r_pw.,cf.osb&fp=533a712cc6ce8ba0&
biw=1280&bih=808>>, 2008, pp. 1-2.
Hariharan, et al., "Project Lachesis: Parsing and Modeling Location Histories", ACM, In the Proceedings of GIScience, 2004, pp. 106-124.
Office Action for U.S. Appl. No. 12/562,588, mailed on Dec. 8, 2011, Yu Zheng, "Mining Life Pattern Based on Location History", 31 pgs.
Schofield, "Its GeoLife, Jim, But Not as we Know it", Guardian News, Retrieved on Nov. 28, 2011 at <<http://www.guardian.co.uk/technology/2008/mar/13/microsoft.research/print>>, Mar. 12, 2008, 2 pgs.
Ye, et al., "Mining Individual Life Pattern Based on Location History," Tenth International Conference on Mobile Data Management: Systems, Services and Middleware, May 18-20, 2009, Taipei, 10 pages.
Zheng, et al., "Searching Your Life on Web Maps", Microsoft Research, Available at <<http://research.microsoft.com/en-us/people/yuzheng/searching_your_life_over_web_maps.pdf>>, 2008, 4 pgs.

(56) References Cited

OTHER PUBLICATIONS

Abowd et al., "Cyberguide: A mobile context-aware tour guide", Wireless Networks, vol. 3, retrieved on Apr. 30, 2010 at <<http://graphics.cs.columbia.edu/courses/mobwear/resources/p421-abowd-97.pdf>>, Oct. 1997, pp. 421-433.
Adomavicius, Tuzhilin, "Toward the Next Generation of Recommender Systems: A Survey of the State-of-the-Art and Possible Extensions", retrieved on Dec. 29, 2009 at <<http://www.inf.unibz.it/~ricci/ATIS/papers/state-of-the-art-2005.pdf>>, IEEE Transactions on Knowledge and Data Engineering, vol. 17, No. 6, Jun. 2005, pp. 734-749.
Agrawal, et al., "Mining Association Rules between Sets of Items in Large Databases", retrieved on Aug. 4, 2009 at <<http://rakesh.agrawal-family.com/papers/sigmod93assoc.pdf>>, ACM, Proceedings of SIGMOD 1993, Jun. 1993, pp. 207-216.
Agrawal, et al., "Mining Sequential Patterns", retrieved on Aug. 4, 2009 at <<http://www.almaden.ibm.com/cs/projects/iis/hdb/Publications/papers/icde95.ps.gz>>, Proceedings of ICDE 1995, Mar. 1995, 12 pgs.
Aizawa, et al., "Capture and Efficient Retrieval of Life Log", available at least as early as Nov. 16, 2007, at <<http://www.ii.ist.i.kyoto-u.ac.jp/~sumi/pervasive04/program/Aizawa.pdf>>, In Pervasive 2004 Workshop on Memory and Sharing of Experiences, Apr. 2004, 6 pgs.
Aizawa, "Digitizing Personal Experiences: Capture and Retrieval of Life Log", at <<http://ieeexplore.ieee.org/iel5/9520/30168/01385968.pdf?arnumber=1385968 >>, Proceedings of the 11th International Multimedia Modelling Conference (MMM'05), Jan. 2005, pp. 1 (abstract).
Allen, "Dredging-up the Past: Lifelogging, Memory and Surveillance", retrieved at <<http://lsr.nellco.org/cgi/viewcontent.cgi?article=1177&context=upenn/wps>>, University of Pennsylvania Law School, 2007, pp. 50.
Amato, et al., "Region Based Image Similarity Search Inspired by Text Search", Third Italian Research Conference on Digital Library Systems, Padova, Italy, Jan. 29-30, 2007, pp. 78-85.
Ankerst et al., "OPTICS: Ordering Points to Identify the Clustering Structure", Proceedings of the ACM SIGMOD 1999 International Conference on Management of Data, Philadelphia, Pennsylvania, retrieved Apr. 30, 2010 at <<http://www.dbs.informatik.uni-muenchen.de/Publicationen/Papers/OPTICS.pdf>>, Jun. 1-3, 1999, 12 pages.
bing.com, Maps, Retrieved on Dec. 28, 2009 at <<http://cn.bing.com/ditu/>>, 2 pgs.
Brakatsoulas, et al., "On Map-Matching Vehicle Tracking Data", VLDB Endowment, In the Proceedings of the 31st International Conference on Very Large Data Bases, Sep. 2005, pp. 853-864.
Brunato, Battiti, "A Location-Dependent Recommender System for the Web", retrieved on Dec. 29, 2009 at <<http://dit.unitn.it/~brunato/pubblicazioni/MobEA.pdf>>, MobEA Workshop, Budapest, May 2003, pp. 1-5.
Cao, et al., "Mining Frequent Spatio-temporal Sequential Patterns", retrieved on Aug. 4, 2009 at <<http://i.cs.hku.hk/~nikos/icdm05.pdf>>, IEEE Computer Society, ICDM 2005, Nov. 2005, pp. 82-89.
Chawathe, "Segment-Based Map Matching", In the Proceedings of the IEEE Intelligent Vehicles Symposium, Jun. 13-15, 2007, pp. 1190-1197.
Chen et al., "GeoTV: Navigating Geocoded RSS to Create an IPTV Experience", Proceedings of the 16th International World Wide Web Conference (WWW 2007), Banff, Alberta, Canada, May 8-12, 2007, pp. 1323-1324, retrieved Apr. 30, 2010 at <<http://www2007.org/posters/poster1042.pdf>>.
Chen et al., "Searching Trajectories by Locations—An Efficiency Study", 2010 Microsoft Research, to be presented at the ACM Conference on Management of Data (SIGMOD), Indianapolis, Indiana, Jun. 6-11, 2010, 12 pages, retrieved on Apr. 16, 2010 at <<http://www.itee.uq.edu.au/~zxf/_papers/sigmod299-chen.pdf>>.

Datta, et al., "Image Retrieval: Ideas, Influences, and Trends of the New Age", ACM Computing Surveys, vol. 40, No. 2, Article 5, Apr. 2008, pp. 1-60.
Deerwester, et al., "Indexing by Latent Semantic Analysis", J. Amer. Soc. Info. Sci., vol. 41, No. 6, Jan. 1990, 34 pages.
Dubuisson et al., "A Modified Hausdorff Distance for Object Matching", Proceedings of the 12th IAPR International Conference on Pattern Recognition, Computer Vision & Image Processing, vol. 1, Oct. 9-13, 1994, pp. 566-568.
Eagle et al, "Reality mining: sensing complex social systems", Springer-Verlag London, Personal and Ubiquitous Computing, vol. 10, Issue 4, Mar. 2006, pp. 255-268.
Estivill-Castro et al, "Data Mining Techniques for Autonomous Exploration of Large Volumes of Geo-referenced Crime Data", 6th International Conference on GeoCom.putation, University of Queensland, Brisbane, Australia, Sep. 24-26, 2001, 12 pages.
Giannotti, et al., "Efficient Mining of Temporally Annotated Sequences", retrieved on Aug. 4, 2009 at <<http://www.siam.org/meetings/sdm06/proceedings/032giannottif.pdf>>, Proceedings of the Sixth SIAM Intl Conference on Data Mining, Apr. 2006, pp. 346-357.
Giannotti, et al., "Trajectory Pattern Mining", retrieved on Aug. 4, 2009 at <<http://cs.gmu.edu/~jessica/temp/p330-giannotti.pdf>>, ACM, KDD'07, Aug. 2007, pp. 330-339.
Goldberg, et al., "Computing the Shortest Path: A Search Meets Graph Theory", SODA'05 Proceedings of the Sixteenth Annual ACM-SIAM Symposium on Discrete Algorithms, Jan. 2005, pp. 156-165, 10 pgs.
Gonzalez, et al., "Adaptive Fastest Path Computation on a Road Network: A Traffic Mining Approach", ACM, In the Proceedings of the 33rd International Conference on Very Large Data Bases, Sep. 23-28, 2007, pp. 794-805.
Gonzalez, Hidalgo, Barabasi, "Understanding individual human mobility patterns Supplementary Material", retrieved on Dec. 29, 2009 at <<http://www.barabasilab.com/pubs/CCNR-ALB_Publications/200806-05_Nature-MobilityPatterns/200806-05_Nature-MobilityPatterns-SuppMat13.pdf>>, Nature, vol. 453, 2008, pp. 779-782.
"GPS Track Route Exchange Forum", 2010 GPSXchange.com website, 3 pages, retrieved on Apr. 16, 2010 at <<http://www.gpsxchange.com/phpBB2/index.php>>.
Greenfeld, "Matching GPS Observations to Locations on a Digital Map", In the Proceedings of the 81st Annual Meeting of the Transportation Research Board, Washington DC, Jan. 2002, 13 pgs.
Gustaysen, "Condor—an application framework for mobility-based context-aware applications", retrieved on Aug. 4, 2009 at <<http://www.comp.lancs.ac.uk/~dixa/conf/ubicomp2002-models/pdf/Gustavsen-goteborg%20sept-02.pdf>>, UBICOMP 2002, 2002, pp. 1-6.
Gutman, "Reach-Based Routing: A New Approach to Shortest Path Algorithms Optimized for Road Networks", In the Proceedings of the Sixth Workshop on Algorithm Engineering and Experiments and the First Workshop on Analytic Algorithmics and Combinatorics, New Orleans, LA, USA, Jan. 10, 2004, 12 pgs.
Han, et al., "Frequent pattern mining: current status and future directions", retrieved on Aug. 4, 2009 at <<http://www.springerlink.com/content/9p5633hm18x55867/fulltext.pdf>>, Springer Science+Business Media, LLC, 2007, pp. 55-86.
Hart, et al., "A Formal Basis for the Heuristic Determination of Minimum Cost Paths", In the Proceedings of IEEE Transactions of Systems Science and Cybernetics, vol. 4, No. 2, Feb. 12, 2007 (First Publication 1968), pp. 100-107.
Horozov et al., "Using Location for Personalized POI Recommendations in Mobile Environments", Proceedings of the 2006 International Symposium on Applications and the Internet (SAINT 2006), Phoenix, Arizona, Jan. 23-27, 2006, pp. 124-129.
Huang, Shekhar, Xiong, "Discovering Co-location Patterns from Spatial Datasets: A General Approach", retrieved on Dec. 29, 2009 at <<http://www.spatial.cs.umn.edu/paper_ps/coloc-tkde.pdf>>, IEEE Transactions on Knowledge and Data Engineering, vol. 16, Issue 12, Dec. 2004, pp. 1472-1485.
Huang, et al., "Project Report (draft version) Spatial Outlier Detection", retrieved on Dec. 12, 2008 at <<http://www-users.cs.umn.

(56) References Cited

OTHER PUBLICATIONS edu/~joh/csci8715/P6.pdf>>, Computer Science Department, University of Minnesota, 2004, pp. 1-8.
Jing, et al., "Hierarchical Optimization of Optimal Path Finding for Transportation Applications", (University of Michigan Research Paper, 1996, pp. 269-276) In the Proceedings of the Fifth International Conference on Informaton and Knowledge Management, 1996, pp. 261-268.
Kanoulas, Du, Xia, Zhang, "Finding Fastest Paths on a Road Network with Speed Patterns", retrieved on Dec. 24, 2009 at <<http://www.inf.unibz.it/dis/teaching/SDB/paper/kanoulasDXZ_icde06_fastestpath.pdf>>, IEEE Computer Society, Proceedings of Conference on Data Engineering (ICDE), 2006, pp. 1-10.
Kavouras, et al., "A Method for the Formalization and Integration of Geographic Categorizations", Draft version from the International Journal of Geographic Information Science, vol. 16, No. 5, 2002, pp. 439-453.
Ke, et al., "Correlated Pattern Mining in Quantitative Databases", ACM Transactions on Database Systems, vol. V, No. N, Apr. 2008, 44 pages.
Ke, et al., "Efficient Correlations Search from Graph Databases", IEEE Transactions on Knowledge and Data Engineering, vol. 20, Issue 12, Dec. 2008, pp. 1601-1615.
Kou, et al., "Spatial Weighted Outlier Detection", retrieved on Dec. 12, 2008 at <<http://www.siam.org/proceedings/datamining/2006/dm06_072kouy.pdf>>, SIAM Conference on Data Mining, 2006, pp. 614-618.
Krumm, et al., "LOCADIO: Inferring Motion and Location from Wi-Fi Signal Strengths", retrieved on Aug. 4, 2009 at <<http://research.microsoft.com/en-us/um/people/horvitz/locadio.pdf>>, Proceedings of Mobiquitous 2004, 2004, pp. 4-13.
Krumm, et al., "Predestination: Inferring Destinations from Partial Trajectories", retrieved on Aug. 4, 2009 at <<http://research.microsoft.com/en-us/um/people/horvitz/predestination.pdf>>, UBICOMP 2006, 2006, pp. 1-18.
Krumm, et al., "Predestination: Where Do You Want to Go Today?", retrieved on Aug. 4, 2009 at <<http://research.microsoft.com/en-us/um/people/horvitz/predestination-ieee.pdf>>, IEEE Computer Magazine, vol. 40, No. 4, Apr. 2007, pp. 105-107.
Lavondes, et al., "Geo::PostalAddress—Country-specific postal address parsing/formatting", retrieved on Dec. 16, 2008 at <<http://search.cpan.org/~pauamma/Geo-PostalAddress-0.04/PostalAddress.pm>>, CPAN, 2004, pp. 1-8.
Lee, et al., "TraClass: Trajectory Classification Using Hierarchical Region-Based and Trajectory-Based Clustering", retrieved on Aug. 4, 2009 at <<http://www.cs.uiuc.edu/homes/hanj/pdf/vldb08_jglee.pdf>>, ACM, VLDB 2008, vol. 1, Issue 1, 2008, pp. 1081-1094.
Lee, et al., "Trajectory Clustering: A Partition-and-Group Framework", retrieved on Aug. 4, 2009 at <<http://www.cs.uiuc.edu/homes/hanj/pdf/sigmod07_jglee.pdf>>, ACM, SIGMOD 2007, 2007, pp. 1-12.
Lee, et al., "Trajectory Outlier Detection: A Partition-and-Detect Framework", retrieved on Aug. 4, 2009 at <<http://www.cs.uiuc.edu/homes/hanj/pdf/icde08_jaegil_lee.pdf>>, IEEE Computer Society, ICDE 2008, 2008, pp. 1-10.
Lemire, Maclachlan, "Slope One Predictors for Online Rating-Based Collaborative Filtering", retrieved on Dec. 29, 2009 at <<http://www.daniel-lemire.com/fr/documents/publications/lemiremaclachlan_sdm05.pdf>>, SIAM Proceedings of Data Mining (SDM), 2005, pp. 1-5.
Li, et al. "A Connectivity-Based Map Matching Algorithm", AARS, Asian Journal of Geoinformatics, 2005, vol. 5, No. 3, pp. 69-76.
Li et al., "Mining User Similarity Based on Location History", ACM Conference on Advances in Geographic Information Systems (ACM GIS 2008), Irvine, California, Nov. 5-7, 2008, Article 34, 10 pages, retrieved on Apr. 16, 2010 at <<http://research.microsoft.com/pubs/74369/Mining%20user%20similarity%20based%20on%20location%20history.pdf>>.

Li, et al., "Traffic Density-Based Discovery of Hot Routes in Road Networks", Springer-Verlag, Advances in Spatial and Temporal Databases, 2007, pp. 441-459.
Liao, et al., "Building Personal Maps from GPS Data", retrieved on Aug. 4, 2009 at <<http://luci.ics.uci.edu/predeployment/websiteContent/weAreLuci/biographies/faculty/djp3/LocalCopy/JR-004.pdf>>, Proceedings of IJCAI MOO 2005, 2005, pp. 249-265.
Liao, et al., "Learning and Inferring Transportation Routines", Elsevier, Artificial Intelligence, vol. 171, Issues 5-6, Apr. 2007, pp. 311-331.
Liao et al., "Learning and Inferring Transportation Routines", American Association for Artificial Intelligence Press (AAAI) 19th National Conference on Artificial Intelligence, San Jose, California, Jul. 25-29, 2004, pp. 348-353, retrieved on Apr. 16, 2010 at <<http://www.cs.rochester.edu/~kautz/papers/gps-tracking.pdf>>.
Liao et al., "Location-based Activity Recognition", Proceedings of the 19th Annual Conference on Neural Information Processing Systems (NIPS-2005), Whistler, British Columbia, Canada, Dec. 5-10, 2005, 8 pages, retrieved on Apr. 16, 2010 at <<http://books.nips.cc/papers/files/nips18/NIPS2005_0773.pdf>>.
Mamoulis, Cao, Kollios, Hadjieleftheriou, Tao, Cheung, "Mining, Indexing, and Querying Historical Spatiotemporal Data", retrieved on Dec. 29, 2009 at <<http://i.cs.hku.hk/~nikos/sigkdd2004_1.pdf>>, ACM Proceedings of Conference on Knowledge Discovery and Data Mining (KDD), Aug. 22, 2004, pp. 236-245.
Manning et al., "An Introduction to Information Retrieval", DRAFT, Cambridge University Press, Apr. 1, 2009, 581 pages, retrieved on Apr. 16, 2010 at <<http://nlp.stanford.edu/IR-book/pdf/irbookonlinereading.pdf>>.
Markowetz, et al., "Design and Implementation of a Geographic Search Engine", Eighth International Workshop on the Web Databases (WebDB 2005), Baltimore, MD, Jun. 16-17, 2005, Baltimore, MD, 6 pages.
Masoud, et al., "Fast Algorithms for Outlier Detection", retrieved on Dec. 12, 2008 at <<http://www.scipub.org/fulltext/jcs/jcs42129-132.pdf>>, Journal of Computer Science, vol. 4, No. 2, 2008, pp. 129-132.
McKeown, et al., "Integrating Multiple Data Representations for Spatial Databases", retrieved on Dec. 12, 2008 at <<http://mapcontext.com/autocarto/proceedings/auto-carto-8/pdf/integrating-multiple-data-representations-for-spatial-databases.pdf>>, Auto Carto 8 Conference Proceedings (ASPRS and ACSM), 1987, pp. 754-763.
Miller, "Analysis of Fastest and Shortest Paths in an Urban City Using Live Vehicle Data from a Vehicle-to-Infrastructure Architecture", retrieved on Dec. 24, 2009 at <<http://www.sigmacoding.com/jeff/publications/fastest-path-ifac09.pdf>>, Federation on Automatic Control Symposium on Control in Transportation Systems (IFAC), Sep. 2009., pp. 1-5.
Miyaki, et al., "Tracking Persons Using Particle Filter Fusing Visual and Wi-Fi Localizations for Widely Distributed Camera", retrieved on Aug. 4, 2009 at <<http://ieeexplore.ieee.org/stamp/stamp.jsp?arnumber=04379287>>, IEEE Intl Conference on Image Processing, ICIP 2007, vol. 3, 2007, pp. 225-228.
Monreale, et al., "WhereNext: a Location Predictor on Trajectory Pattern Mining", retrieved Aug. 4, 2009 at <<http://delivery.acm.org/10.1145/1560000/1557091/p637-monreale.pdf?key1=1557091& key2=5182739421&coll=GUIDE&dl=GUIDE& CFID=47499709&CFTOKEN=90308932>>, ACM, KDD 2009, 2009, pp. 637-645.
Morimoto, "Mining Frequent Neighboring Class Sets in Spatial Databases", retrieved on Dec. 29, 2009 at <<http://delivery.acm.org/10.1145/510000/502564/p353-morimoto.pdf?key1=502564&key2=1634712621&coll=GUIDE&dl=GUIDE& CFID=70432903& CFTOKEN=93744375>>, ACM Proceedings of Conference on Knowledge Discovery and Data Mining (KDD), 2001, pp. 353-358.
Nicholson, "Finding the Shortest Route Between Two Points in a Network", British Computer Society, The Computer Journal, 1966, vol. 9, No. 3, pp. 275-280.
Park et al., "Location-Based Recommendation System Using Bayesian User's Preference Model in Mobile Devices", J. Indulska

(56) References Cited

OTHER PUBLICATIONS et al. (Eds.): UIC 2007, LNCS 4611, pp. 1130-1139, retrieved on Apr. 30, 2010 at <<http://sclab.yonsel.ac.kr/publications/paper/IC/UIC07-MHPark.pdf>>.

Patterson, et al., "Inferring High-Level Behavior from Low-Level Sensors", Springer-Verlag Berlin Heidelberg, Lecture Notes in Computer Science, International Conference on Ubiquitous Computing, 2003, vol. 2864, pp. 73-89.

Patterson, et al., "Inferring High-Level Behavior from Low-Level Sensors", retrieved on Aug. 4, 2009 at <<http://www.cs.rochester.edu/u/kautz/papers/High-Level-140.pdf>>, UBICOMP 2003, 2003, pp. 1-18.

Pfoser, et al., "Capturing the Uncertainty of Moving-Object Representations", Springer-Verlag, In the Proceedings of the 6th International Symposium on Advances in Spatial Databases, Lecture Notes in Computer Science, 1999, vol. 1651, pp. 111-131.

Popivanov, et al., "Similarity Search Over Time-Series Data Using Wavelets", Proceedings of the 18th International Conference on Data Engineering (ICDE'02),IEEE Computer Society, San Jose, CA, Feb. 26-Mar. 1, 2002, 10 pages.

Quddus, et al."Current Map-Matching Algorithms for Transport Applications: State-of-the-Art and Future Research Directions", Elsevier Ltd., Transportation Research Part C: Emerging Technologies, 2007, vol. 15, Issue 5, pp. 312-328.

Rekimoto, et al., "LifeTag: WiFi-based Continuous Location Logging for Life Pattern Analysis", retrieved on Aug. 4, 2009 at <<http://209.85.229.132/search?q=cache:fCil8hzKWxQJ:www.sonycsl.co.jp/person/rekimoto/papers/loca07.pdf+mining+individual+life+pattern+based+on+location+history&cd=5&hl=en&ct=clnk&gl=uk>>, LoCA 2007, 2007, pp. 35-49.

Saltenis, "Outlier Detection Based on the Distribution of Distances between Data Points", retrieved on Dec. 12, 2008 at <<http://www.mii.lt/informatica/pdf/INFO558.pdf>>, Informatica, vol. 15, No. 3, 2004, pp. 399-410.

Salton, et al., "A Vector Space Model for Automatic Indexing", Communications of the ACM, vol. 187, No. 11, Nov. 1975, pp. 613-620.

Salton, "Dynamic Document Processing", Communications of the ACM, vol. 15, Issue 7, Jul. 1972, pp. 658-668.

Schonfelder, "Between Routines and Variety Seeking: The Characteristics of Locational Choice in Daily Travel", retrieved on Dec. 12, 2008 at <<http://www.ivt.ethz.ch/vpl/publications/reports/ab192.pdf>>, 10th International Conference on Travel Behaviour Research, Aug. 10-15, 2003, pp. 1-32.

Sellen, et al., "Do Life-Logging Technologies Support Memory for the Past? An Experimental Study Using SenseCam", available at least as early as Nov. 16, 2007, at <<http://research.microsoft.com/sds/papers/SensecamMemCHICamRdy.pdf>>, pp. 10.

Simon, Frohlich, "A Mobile Application Framework for the geospatial Web", retrieved on Apr. 16, 2010 at <<http://www2007.org/papers/paper287.pdf>>, ACM, Proceedings of World Wide Web Conference (WWW), May 8, 2007, pp. 381-390.

Singh et al., "Relational Learning via Collective Matrix Factorization", Proceedings of the 14th ACM SIGKDD International Conference on Knowledge Discovery and Data Mining, Las Vegas, Nevada, Aug. 24-27, 2008, pp. 650-658, retrieved on Apr. 30, 2010 at <<http://www.cs.cmu.edu/-ggordon/CMU-ML-08-109.pdf>>.

Sohn, et al., "Mobility Detection Using Everyday GSM Traces", retrieved on Aug. 4, 2009 at <<http://www.placelab.org/publications/pubs/mobility-ubicomp2006.pdf>>, UBICOMP 2006, 2006, pp. 212-224.

Srebro et al., "Weighted Low-Rank Approximations", Proceedings of the 20th International Conference on Machine Learning (ICML-2003), Washington, DC, Aug. 21-24, 2003, 8 pages, retrieved on Apr. 30, 2010 at <<http://people.scail.mit.edu/tommi/papers/SreJaa-icml03.pdf>>.

Takeuchi et al., "City Voyager: An Outdoor Recommendation System Based on User Location History", Proceedings of the 3rd International Conference on Ubiquitous Intelligence and Couputing (UIC 2006), Wuhan, China, Sep. 3-6, 2006, pp. 625-636.

Takeuchi et al., "An Outdoor Recommendation System Based on User Location History", Proceedings of the 1st International Workshop on Personalized Context Modeling and Management for UbiComp Applications (ubiPCMM 2005), Tokyo, Japan Sep. 11, 2005, pp. 91-100, retrieved on Apr. 16, 2010.

Taylor, et al., "Virtual Differential GPS & Road Reduction Filtering by Map Matching", In the Proceedings of ION'99, Twelfth International Technical Meeting of the Satellite Division of the Institute of Navigation, 1999, pp. 1675-1684.

Tsoukatos, et al., "Efficient Mining of Spatiotemporal Patterns", Proceedings of the 7th International Symposium on Spatial and Temporal Databases LNCS 2121, Redondo Beach, CA, Jul. 12-15, 2001, pp. 425-442.

Wang et al., "An Optimized Location-based Mobile Restaurant Recommend and Navigation System", WSEAS Transactions on Information Science and Applications, vol. 6, Issue 5, May 2009, pp. 809-818, retrieved on Apr. 16, 2010 at <<http://www.wseas.us/e-library/transactions/information/2009/29-186.pdf>>.

Wang, et al., "CLOSET+: Searching for the Best Strategies for Mining Frequent Closed Itemsets", retrieved on Aug. 4, 2009 at <<http://www.cs.umd.edu/~samir/498/wang03closet.pdf>>, ACM, SIGKDD 2003, 2003, pp. 236-245.

Wang et al., "Unifying User-based adn Item-based Collaborative Filtering Approaches by Similarity Fusion", Proceedings of the 29th Annual International ACM SIGIR Conference on Research and Development in Information Retrieval, Seattle, Washington, Aug. 6-11, 2006, pp. 501-508, retrieved on Apr. 30, 2010 at <<http://ict.ewi.tudelft.nl/pub/jun/sigir06_similarityfuson.pdf>>.

Ward et al., "Unsupervised Activity Recognition Using Automatically Mined Common Sense", American Association for Artificial Intelligence (AAAI 2005), Proceedings of the 20th National Conference on Artificial Intelligence, Pittsburgh, Pennsylvania, Jul. 9-13, 2005, 7 pages, retrieved Apr. 30, 2010 at <<http://www.cs.dartmouth,edu/-tanzeem/pubs/AAA1051WyattD.pdf>>.

Winogard, "Dynamic Cartograms for Navigating Geo-referenced Photographs", available at least as early as Nov. 16, 2007, at <<http://cs.stanford.edu/research/project.php?id=289>>, pp. 2.

Xiao, Xie, Luo, Ma, "Density Based Co-Location Pattern Discovery", retrieved on Dec. 29, 2009 at <<http://www.cse.ust.hk/~xiaoxy/pub/gis-08.pdf>>, ACM Proceedings of Conference on Advances in Geographic Information Systems (SIGSPATIAL), OLAP and co-location mining, Article 29, Nov. 5, 2008, pp. 1-10.

Yan, et al., "Clospan: Mining Closed Sequential Patterns in Large Datasets", retrieved on Aug. 4, 2009 at <<http://citeseerx.ist.psu.edu/viewdoc/download;jsessionid=AFADA02A222CC497F30CEC7317F6C7A5?doi=10.1.1.12.3538&rep=rep1&type=pdf>>, Proceedings of SIAM Int. Conference on Data Mining, SDM 2003, 2003, pp. 166-177.

Yan, et al., "Feature-based Similarity Search in Graph Structures", ACM Transactions on Database Systems, vol. V, No. N, Jun. 2006, 36 pages.

Yavas, et al., "A data mining approach for location prediction in mobile environments", retrieved on Aug. 4, 2009 at <<http://www.cs.bilkent.edu.tr/~oulusoy/dke05.pdf>>, Elsevier B.V., 2004, pp. 121-146.

Zhang, Mamoulis, Cheung, Shou, "Fast Mining of Spatial Collocations", retrieved on Dec. 29, 2009 at <<http://i.cs.hku.hk/~cheung/publication/sigkdd2004_2.pdf>>, ACM Proceedings of Conference on Knowledge Discovery and Data Mining (SIGKDD), Aug. 22, 2004, pp. 384-393.

Zhang, et al., "Mining Non-Redundant High Order Correlations in Binary Data", International Conference on Very Large Data Bases (VLDB), Aukland, NZ, Aug. 23-28, 2008, pp. 1178-1188.

Zhao, et al., "Searching for Interacting Features", Proceedings of the 20th International Joint Conference on Artificial Intelligence, Hyderabad, India, Jan. 6-12, 2007, pp. 1156-1161.

Zheng et al., "Collaborative Filtering Meets Mobile Recommendation: A User-centered Approach", to be presented at the Association for the Advancement of Artificial Intelligence (AAAI) 24th Conference on Artificial Intelligence, Atlanta, Georgia, Jul. 11-15, 2010, 6 pages., retrieved on Apr. 16, 2010 at <<http://research.microsoft.

(56) References Cited

OTHER PUBLICATIONS com/pubs/122244/AAAI10- Collaborative%20Filtering%20Meets% 20Mobile%20Recommendations%20A%20User-centered% 20Approach.pdf>>.
Zheng, et al., "GeoLife: Managing and Understanding Your Past Life over Maps", IEEE Computer Society, In the Proceedings of the Ninth International Conference on Mobile Data Management, 2008, pp. 211-212, 2 pgs.
Zheng, Wang, Zhang, Xie, Ma, "GeoLife: Managing and Understanding Your Past Life over Maps", retrieved on Dec. 29, 2009 at <<http://research.microsoft.com/en-us/people/yuzheng/zheng-geolife-managing_and_understanding_your_past_life_over_map.pdf>>, IEEE Computer Society, Proceedings of Conference on Mobile Data Manage, 2008, pp. 211-212.
Zheng et al., "GeoLife2.0: A Location-Based Social Networking Service", Proceedings of the 10th International Conference on Mobile Data Management Systems, Services and Middleware, Taipei, Taiwan, May 18-20, 2009, pp. 357-358, retrieved on Apr. 16, 2010 at <<http://ieeexplore.ieee.org/stamp/stamp.jsp?tp=&arnumber=5088957>>.
Zheng et al., "Joint Learning User's Activities and Profiles from GPS Data", ACM Geographic Information Systems Workshop on Location Based Social Networks (ACM LBSN 2009), Seattle, Washington, Nov. 3, 2009, pp. 17-20, retrieved on Apr. 16, 2010 at <<http://delivery.acm.org/10.1145/1630000/1629894/p17-zheng.pdf?key1=1629894&key2=6324041721&coll=GUIDE&dl=GUIDE&CFID=86381688&CFTOKEN=49903381>>.
Zheng et al., "Learning Transportation Mode from Raw GPS Data for Geographic Applications on the Web", ACM Conference on World Wide Web (ACM WWW 2008)), Apr. 21, 2008, pp. 247-256, retrieved on Apr. 16, 2010 at <<http://research.microsoft.com/pubs/78567/fp485-Zheng.pdf>>.
Zheng et al., "Microsoft GeoLife Project, GeoLife: Building social networks using human location history", Microsoft Research, 2009, 4 pages, retrieved on Apr. 16, 2010 at <<http://research.microsoft.com/en-us/projects/geolife/default.aspx>>.
Zheng et al., "Mining Interesting Locations and Travel Sequences from GPS Trajectories", Proceedings of the 18th International Conference on World Wide Web (WWW 2009), Madrid, Spain, Apr. 20-24, 2009, pp. 791-800, retrieved on Apr. 16, 2010 at <<http://research.microsoft.com/pubs/79440/fp120-zheng.pdf>>.
Zheng et al., "Recommending Friends and Locations Based on Individual Location History", ACM Trans. Asian Language Information Processing, vol. 6, No. 3, Article 9, Ch. 45, Nov. 2007, 47 pages, retrieved on Apr. 16, 2010 at <<http://research.microsoft.com/pubs/122435/Recommending%20friends%20and%20locations%20based%20on%20individual%20location% 20history.pdf>>.
Zheng, Li, Chen, Xie, Ma, "Understanding Mobility Based on GPS Data", retrieved on Dec. 29, 2009 at <<http://delivery.acm.org/10.1145/1410000/1409677/p312-zheng.pdf?key1=1409677&key2=0364712621&coll=GUIDE&dl=GUIDE&CFID=70433597& CFTOKEN=93582958>>, ACM Proceedings of Conference on Ubiquitous Computing (UbiComp), vol. 344, Sep. 21, 2008, pp. 312-321.
Ge et al., "An Energy-Efficient Mobile Recommender System", KDD, Jul. 2010, 9 pages.
Office action for U.S. Appl. No. 12/712,857, mailed on Aug. 5, 2013, Zheng, et al., "Map-Matching for Low-Sampling-Rate GPS Trajectories", 15 pages.
Office action for U.S. Appl. No. 13/324,758, mailed on Jul. 11, 2013, Zheng et al., "Urban Computing of Route-Oriented Vehicles", 47 pages.
Domain Name System (DNS), retrieved on Apr. 29, 2008 at <<http://www.unix.org.ua/orelly/networking/firewall/ch08_10.htm>>, Unix, pp. 1-11.
Domain Name System (DNS) A Guide to TCP/IP, retrieved Apr. 29, 2008 at <<http://web.syr.edu/~djmolta/ist452/ch_07.ppt>>, Thomson Learning Course Technology, pp. 1-56.

The European Search Report mailed Nov. 21, 2012 for European patent application No. 09714738.3, 9 pages.
Espinoza et al, "GeoNotes: Social and Navigational Aspects of Location-Based Information Systems", Proc Ubicomp 3rd Intl Conf on Ubiquitous Computing, Oct. 2001, LNCS 2201, 16 pgs.
Eustice et al, "The Smart Party: A Personalized Location Aware Multimedia Experience", Consumer Communications and Networking Conf, Jan. 2008, 5 pgs.
"Flow Control Platform (FCP) Solutions", retrieved Jul. 5, 2007 at <<http://k2colocation.com/network-services/fcp.cfm>>, K2 Colocation, 2005, pp. 2.
"Global Server Load Balancing for Disaster Recovery, Business Continuity, Performance Optimization and Datacenter Management ", retrieved Jul. 6, 2007 at <<http://www.zeus.com/documents/en/ZXT/ZXTM_Global_Load_Balancer.pdf>>, Zeus Technology Limited, 1995-2007, pp. 4.
GPS Sharing, retrieved Feb. 4, 2013 at http://web.archive.org/web/20071129224158/http://gpssharing.com, 2 pgs.
Hariharan et al, "NetTrust—Recommendation System for Embedding Trust in a Virtual Realm", ACM Recommender Systems, Oct. 2007, 6 pgs.
Intl Search Report for PCT/US2009/063023, mailed Jun. 10, 2010, 4 pgs.
Jarvelin et al, "Cumulated Gain Based Evaluation of IR Techniques", ACM Transactions on Information Systems, vol. 20, No. 4, Oct. 2002, 25 pgs.
Jones et al, "P3 Systems: Putting the Place Back into Social Networks", IEEE Internet Computing, Sep.-Oct. 2005, 9 pgs.
Lee et al, "Efficient Mining of User Behaviors by Temporal Mobile Access Patterns", Intl Journal of Computer Science and Network Security, vol. 7, No. 2, Feb. 2007, 7 pgs.
Linden et al, "Amazon.com Recommendations, Item to Item Collaborative Filtering", IEEE Internet Computing, Jan. and Feb. 2003, 5 pgs.
Linden, "The End of Federated Search?", at <<http://glinden.blogspot.com/2007/03/end-of-federated-search.html>>, Mar. 24, 2007, pp. 9.
Matsuo et al, "Inferring Long Term User Properties Based on Users' Location History", Proc 20th Intl Joint Conf on Artificial Intelligence, Jan. 2007, 7 pgs.
McDonald et al, "Expertise Recommender: A Flexible Recommendation System and Architecture", CSCW 2000, Dec. 2000, 10 pgs.
Michael et al, "Location Based Intelligence—Modeling Behavior in Humans Using GPS", Proc Intl Symposium on Technology and Society, Jun. 2006, 8 pgs.
Office Action for U.S. Appl. No. 12/041,599, mailed on Jul. 25, 2011, Arne Josefsberg, "Failover in an Internet Location Coordinate Enhanced Domain Name System", 22 pgs.
Office action for U.S. Appl. No. 13/324,758, mailed on Jan. 18, 2013, Zheng et al., "Urban Computing of Route-Oriented Vehicles", 48 pages.
Office action for U.S. Appl. No. 12/711,130, mailed on Oct. 4, 2012, Zheng et al., "Mining Correlation Between Locations Using Location History", 15 pages.
Office action for U.S. Appl. No. 13/188,013, mailed on Nov. 15, 2011, Josefsberg et al., "Internet Location Coordinate Enhanced Domain Name System", 14 pages.
Office action for U.S. Appl. No. 12/353,940, mailed on Nov. 2, 2012, Zheng et al., "Detecting Spatial Outliers in a Location Entity Dataset", 11 pages.
Office action for U.S. Appl. No. 12/567,667, mailed on Dec. 19, 2012, Zheng et al., "Recommending Points of Interests in a Region", 18 pages.
Office action for U.S. Appl. No. 12/353,940, mailed on Feb. 28, 2013, Zheng et al., "Detecting Spatial Outliers in a Location Entity Dataset", 9 pages.
Office Action for U.S. Appl. No. 12/041,599, mailed on Feb. 9, 2012, Arne Josefsberg, "Failover in an Internet Location Coordinate Enhanced Domain Name System", 27 pgs.
Office action for U.S. Appl. No. 12/041,599, mailed on Sep. 21, 2012, Josefsberg et al., "Failover in an Internet Location Coordinate Enhanced Domain Name System", 9 pages.

(56) References Cited

OTHER PUBLICATIONS

Park, et al., "CoDNS: Improving DNS Performance and Reliability via Cooperative Lookups", Proc 6th conf on Symposium on Operating Systems Design and Implementation, vol. 6, Dec. 2004, pp. 1-16.
Sarwar et al, "Application of Dimensionality Reduction in Recommender System, A Case Study", ACM WebKDD Workshop, Aug 2000, 12 pgs.
Shekhar et al., "A Unified Approach to Detecting Spatial Outliers", GeoInformatica, vol. 7, Issue 2, Jun. 2003, 28 pages.
Shiraishi, "A User-Centric Approach for Interactive Visualization and mapping of Geo-sensor Data", Networked Sensing Systems, 2007, INSS, Fourth International Conference on IEEE, Jun. 1, 2007, pp. 134-137.
Spertus et al, "Evaluating Similarity Measures: A Large Scale Study in the Orkut Social Network", Proc 11th ACM SIGKDD Intl Conf on Knowledge Discovery in Data Mining, Aug. 2005, 7 pgs.
Spinellis, "Position-Annotated Photographs: A Geotemporal Web", IEEE Pervasive Computing IEEE Service Center, Los Alamintos, CA, vol. 2, No. 2, Apr. 1, 2003, pp. 72-79.
Sun, "Outlier Detection in High Dimensional, Spatial and Sequential Data Sets", School of Information Technologies, The University of Sydney, Sep. 2006, 118 pages.
Tai et al., "Recommending Personalized Scenic Itinerary with Geo-Tagged Photos", ICME, 2008, 2008 IEEE Intl Conf on Multimedia and Expo, Apr.-Jun. 2008, 4 pages.
Wang et al., "Spatiotemporal Data Modelling and Management: a Survey", Technology of Object-Oriented Languages and Systems, 2000, ASI, Proceedings of the 36th International Conference on Oct. 30-Nov. 4, 2000, IEEE, pp. 202-211.
Weng et al., "Design and Implementation of Spatial-temporal Data Model in Vehicle Monitor-System", Proceeding of the 8th International Conference on Geocomputation, Aug. 3, 2005, pp. 1-8.
Wikipedia, "Operating System", retrived from <<http://en.wikipedia.org/wiki/Operating_system>> on Oct. 8, 2010, 17 pgs.
Xie, "Understanding User Behavior Geospatially", Microsoft Research, Nov. 2008, 2 pgs.
Yegulalp, Change the Windows 2000 DNS cache, retrieved on Apr. 29, 2008 at http://searchwincomputing.techtarget.com/tip/0,289483,sid68_gci1039955,00.html>>, SearchWinComputing.com, pp. 1-3.
Liao, et al. "Learning and inferring transportation routines", Artificial Intelligence, vol. 171, 2007, pp. 311-331.
Office action for U.S. Appl. No. 12/037,347, mailed on Jan. 13, 2014, Zheng, et al., "System for Logging Life Experiences Using Geographic Cues", 8 pages.
Office action for U.S. Appl. No. 12/712,857, mailed on Feb. 21, 2014, Zheng, et al., "Map-Matching for Low-Sampling-Rate GPS Trajectories", 15 pages.
Office action for U.S. Appl. No. 12/353,940, mailed on Mar. 4, 2014, Zheng, et al., "Detecting Spatial Outliers in a Location Entity Dataset", 10 pages.
Office action for U.S. Appl. No. 12/567,667, mailed on Feb. 25, 2014, Zheng et al., "Recommending Points of Interests in a Region", 31 pages.
Office action for U.S. Appl. No. 12/041,608, mailed on Nov. 22, 2013, Josefsberg, et al., "Client-Side Management of Domain Name Information", 7 pages.
Office action for U.S. Appl. No. 12/712,857, mailed on Jan. 6, 2015, Zheng, et al., "Map-Matching for Low-Sampling-Rate GPS Trajectories", 15 pages.
Office Action for U.S. Appl. No. 13/324,758, mailed on Dec. 24, 2014, Zheng et al., "Urban Computing of Route-Oriented Vehicles", 54 pages.
Ashbrook, et al., "Using GPS to Learn Significant Locations and Predict Movement Across Multiple Users", Journal of Personal and Ubiquitous Computer Archive, vol. 7, Issue 5, Oct. 2003, 15 pages.
Breiman, "Bagging Pedictors", Machine Learning, vol. 24, No. 2, Aug. 1996, pp. 123-140.
Chen, et al., "GeoTracker Geospatial and Temporal RSS Navigation", WWW2007, May 2007, pp. 41-50.
"CRF++: Yet Another CRF Toolkit", retrieved on Jan. 18, 2008 from <<http://crfpp.sourceforge.net>>, 13 pages.
Hadjieleftheriou, et al., "Complex Spatio-Temporal Pattern Queries", Proceedings of the 31st VLDB Conference, Sep. 2005, pp. 877-888.
Hadjieleftheriou, et al., "Efficient Indexing of Spatiotemporal Objects", Proceedings of the 8th International Conference on Extending Database Technology: Advances in Database Technology, Mar. 2002, 10 pages.
Han, et al., "Predicting User Movement with a Combination of Self-Organizing Map and Markov Model", ICANN 2006, Part II, LNCS 4132, Sep. 2006, pp. 884-893.
International Preliminary Report on Patentability cited in PCT Application No. PCT/US2009/032777 dated Sep. 10, 2010, 6 pages.
Ishi, et al., "Head Motion During Dialogue Speech and Nod Timiong Control in Humanoid Robots", 5th ACM/IEEE International Conference on Human-Robot Interaction (HRI'10), Mar. 2010, pp. 293-300.
International Search Report and Written Opinion Received for PCT Application No. PCT/US2009/0327777, mailed Aug. 26, 2009, 10 pages.
International Search Report dated Aug. 19, 2009 for PCT Application No. PCT/US2009,032778, filed Jan. 31, 2009, 11 pages.
Lafferty, et al., "Conditional Random Fields: Probabilistic Models for Segmenting and Labeling Sequence Data", Proceedings of the 18th International Conference on Machine Learning, Jun. 2001, 8 pages.
Mitchell, et al., "Six in the City: Introducing Real Tournament—A Mobile IPv6 Based Context-Aware Multiplayer Game", NetGames'03, May 2003, pp. 91-100.
"North York Moors and Yorkshire Wolds Mountain Bke (MTB) Routes", retrieved on Jan. 17, 2008 from <<http://www.mtb-routs.co.uk/northyorkmorrs/default.aspx>>, 4 pages.
Non-Final Office Action for U.S. Appl. No. 12/041,608, mailed on Jun. 25, 2014, Josefsberg, et al., "Client-Side Management of Domain Name Information", 4 pages.
Office Action for U.S. Appl. No. 12/712,857, mailed on Jun. 6, 2014, Yu Zheng, "Map-Matching for Low-Sampling-Rate GPS Trajectories", 14 pages.
Office action for U.S. Appl. No. 12/712,053, mailed on Jun. 6, 2014, Zheng et al., "Route Computation Based on Route-Oriented Vehicle Trajectories", 24 pages.
Office Action for U.S. Appl. No. 12/353,940, mailed on Jul. 17, 2014, Yu Zheng, "Detecting Spatial Outliers in a Location Entity Dataset", 10 pages.
"SlamXR List Routes Page by Microsoft Research Community Technologies Group", retrieved on Jan. 18, 2008 from <<http://www.msslam.com/slamxr/ListRoutes.aspx>, 2 pages.
"SportsDo", retrieved on Jan. 17, 2008 from <<http://sportsdo.net/Activity/ActivityBlog.aspx>>, 3 pages.
Strachan, et al., "gpsTunes Controlling Navigation via Audio Feedback", Proceedings of MobileHCI, Sep. 2005, 4 pages.
Sui, "Decision Support Systems Based on Knowledge Management", Proceedings of the International Conference on Services Systems and Services Management (ICSSSM'05), Jun. 2005, vol. 2, pp. 1153-1156.
Tezuka, et al., "Toward Tighter Integration of Web Search with a Geographic Information System", WWW2006, May 2006, 10 pages.
Theodoridis, et al., "Spatio-Temporal Indexing for Large Multimedia Applications", Proceedings of the IEEE International Conference on Multimedia Systems, Jun. 1996, 9 pages.
Theodoridis, et al., "Specifications for Efficient Indexing in Spatiotemporal Databases", Proceedings of the SDDBM'98, Jul. 1998, 10 pages.
Toyama, et al., "Geographic Location Tags on Digital Images", MM'03, Nov. 2003, 11 pages.
"Twittervision", retrieved on Jan. 18, 2008 from <<http://twittervision.com>>, 1 page.

(56) References Cited

OTHER PUBLICATIONS

Wasinger, et al., "M3I in a Pedestian Navigation & Exploration System", Proceedings of the Fifth International Symposium on Human Computer Interaction with Mobile Devices, Sep. 2003, 5 pages.
Wei, et al., "A Service-Portlet Based Visual Paradigm for Personalized Convergence of Information Resources", 2nd IEEE International Conference on Computer Science and Information Technology, Aug. 2009, pp. 119-124.
"Weka 3: Data Mining Software in Java", retreived on Jan. 18, 2008 from <<http://www.cs.waikato.ac.nz/ml/weka/index_home.html>>, 1 page.
"Welcome to WalkJogRun", retreived on Jan. 17, 2008 from <<http://www.walkjogrun.net>>, 1 page.
"WikiWalki Community Trail Guide", retreived on Jan. 17, 2008 from <<http://www.wikiwalki.com>>, 1 page.
Zhang, et al., "Research on Information Fusion on Evaluation of Driver Fatigue", 2008 International Symposium on Computer Scientc and Computational Technology, Dec. 2008, pp. 151-155.
Final Office Action for U.S. Appl. No. 12/567,667, mailed on Aug. 27, 2014, Yu Zheng, "Recommending Points of Interests in a Region", 7 pages.
Office action for U.S. Appl. No. 12/712,053, mailed on Mar. 10, 2015, Zheng et al., "Route Computation Based on Route-Oriented Vehicle Trajectories", 22 pages.
Office action for U.S. Appl. No. 13/324,758, mailed on Jun. 17, 2015, Zheng et al., "Urban Computing of Route-Oriented Vehicles", 38 pages.
Office action for U.S. Appl. No. 14/659,125, mailed on Jun. 19, 2015, Inventor #1, "Recommending Points of Interests in a Region", 7 pages.
Final Office Action for U.S. Appl. No. 12/712,857, mailed on Oct. 7, 2015, Yu Zheng, "Map-Matching for Low-Sampling-Rate GPS Trajectories", 18 pages.
Office action for U.S. Appl. No. 12/712,857, mailed on Jun. 25, 2015, Yu Zheng,"Map-Matching for Low-Sampling-Rate GPS Trajectories", 17 pages.
Weeks, Darren, "LifeLog: Because Big Brother Cares What You're Thinking," retrieved at <<http://www.sweetliberty.org/issues/privacy/lifelog.htm>> on Dec. 3, 2005, Big Brother, 5 pages.
Wikipedia, "DARPA LifeLog," retrieved at <<https://en.wikipedia.org/wiki/DARPA_LifeLog>>, Dec. 14, 2013, 1 page.
Wikipedia, "Nokia Lifeblog", retrieved at <<https://en.wikipedia.org/wiki/Nokia_Lifeblog>>, on Feb. 26, 2008, 2 pages.
Wyatt et al., "Unsupervised Activity Recognition Using Automatically Mined Common Sense", American Association for Artificial Intelligence (AAAI 2005), Proceedings of the 20th National Conference on Artificial Intelligence, Pittsburgh, Pennsylvania, Jul. 9-13, 2005, pp. 21-27, 7 pages.
Xu et al., "RT-Tree: An Improved R-Tree Indexing Structure for Temporal Spatial Databases," Proc. of the Intl. Symp. on Spatial Data Handling, SDH, pp. 1040-1049, Jul. 1990, 5 pages.
Yuan et al., "An Interactive-Voting Based Map Matching Algorithm," In IEEE Conference on Mobile Data Management (MDM), 2010, 10 pages.
Zheng, et al., "Collaborative Location and Activity Recommendations with GPS History Data," Proceedings of the 19th International Conference on World Wide Web, 2010, pp. 1029-1038.
Zheng et al., "Cross-domain Activity Recognition," In Proc. Of the 11th International Conference on Ubiquitous Computing (Orlando, USA, 2009), ACM Press, pp. 61-70.
Zheng et al., "Understanding Transportation Modes Based on GPS Data for Web Applications," ACM Transactions on the Web, 4(1):1-36, 2010.
Zhou et al., "Close Pair Queries in Moving Object Databases," Proceedings of ACM GIS, pp. 2-11, 2005, 10 pages.
Agarwal, et al., "Geometric Approximation via Coresets," Combinatorial and Computational Geometry, MSRI Publications, vol. 52, 2005, 30 pages.
Agrawal, et al., "Efficient Similarity Search in Sequent Databases," IBM Almaden Research Center, San Jose, California, 4th International Conference, Oct. 1993, 15 pages.
Blandford, Rafe, "Looking at Lifeblog," retrieved at <<http://www.allaboutsymbian.com/features/item/Looking_at_Lifeblog.php>>, Oct. 18, 2004, 14 pages.
Carter, et al., "When Participants Do the Capturing: The Role of Media in Diary Studies," CHI 2005: 899-908, 10 pages.
Chakka, et al., "Indexing Large Trajectory Data Sets With SETI*," Proceedings of the 2003 CIDR Conference, pp. 1-12.
Dumas, et al., "Stuff I've Seen: A System for Personal Information Retrieval and Re-Use," SIGIR, Aug. 1, 2003, pp. 1-8.
Flickr. http://www.flickr.com/, 1 pages.
Freeman, Eric, "Lifestreams: A Storage Model for Personal Data," SIGMOD Record, vol. 25, No. 1, Mar. 1996, pp. 80-86.
Fu, et al., "Heuristic shortest path algorithms for transportation applications: State of the art," Science Direct, Computers & Operations Research 33 (2006) 3324-3343, available May 3, 2005; pp. 3324-3343.
Geek Magazine, "LifeLog: DARPA looking to record lives of interested parties," retrieved at <<http://www.geek.com/news/lifelog-darpa-looking-to-record-lives-of-interested-parties-552879/>>, retrieved on Sep. 23, 2013, published on Jun. 3, 2003, 4 pages.
Gemmell, et al., "MyLifeBits: A Personal Database for Everything," Microsoft Bay Area Research Center, MSR-TR-2006-23, Feb. 20, 2006, pp. 1-18.
GeoLife GPS Trajectories, <<http://research.microsoft.com/en-us/downloads/b16d359d-d164-469e-9fd4-daa38f2b2e13/default.aspx.
Hadjieleftheriou, et al., "Indexing Spatio-temporal Archives," Proceedings of Extending Database Technology 2002, pp. 1-22.
Hanlon, Mike, "Nokia Lifeblog is an automated multimedia diary," retrieved at <<http://www.gizmag.com/go/2729/>>, Jun. 4, 2004, 5 pages.
International Preliminary Report on Patentability for PCT Application No. PCT/US2009,032774, mailed on Aug. 31, 2010.
International Search Report and the Written Opinion for PCT Application No. PCT/US2009/032778, mailed on Aug. 19, 2009, 11 pgs.
Kim et al., "A Spatiotemporal Data and Indexing," Proceedings of IEEE Region 10 International Conference eon Electrical and Electronic Technology, Singapore, Aug. 19-22, 2001, pp. 110-113.
Klemmer, et al., "Where Do Web Sites Come From? Capturing and Interacting with Design History," CHI, Contextual Displays Paper, Apr. 20-25, 2002, vol. 4, No. 1, pp. 1-8.
Kollios, et al., "Indexing Animated Objects Using Spatiotemporal Access Methods," A TimeCenter Technical Report, TR-54, Jan. 25, 2001, pp. 1-32.
Kolovson et al., "Segment Indexes: Dynamic Indexing Techniques for Multi-Dimensional Interval Data," Proceedings of the ACM SIGMOD Conference on Management of Data, 1991, pp. 138-147, 10 pages.
Kuechne et al., "New Approaches for Traffic Management in Metropolitan Areas," In 10th IFAC Symposium on Control in Transportation Systems, Aug. 2003, 9 pages.
Kumar, et al., "Approximate Minimum Enclosing Balls in High Dimensions Using Core-Sets," Journal of Experimental Algorithmics (JEA), vol. 8, 2003, Artl. No. 1.1, pp. 1-29.
Kumar, et al., "Designing Access Methods for Bitemporal Databases," IEEE Trans. Knowl. Data Eng., 1998, pp. 1-41.
Lou, et al., "Map-Matching for Low-Sampling-Rate GPS Trajectories," ACM GIS '09, ISBN 978-1-60558-649, Nov. 4-6, 2009, pp. 1-10.
Mead, Nick, "Lifeblog 2.5," retrieved at <<http://lifeblog.en.softonic.com/symbian>>, Feb. 25, 2008, 2 pages.
Mountain Bike. http://www.mtb-tracks.co.uk/northyorkmoors/default.aspx, retrieved Jan. 18, 2008, 2 pages.
Nascimento, et al., "Evaluation of Access Structures for Discretely Moving Points", Proceedings of the International Workshop on Spatio-Temporal Database Management, Sep. 1, 1998, State Univ. of Campinas, Brazil, 18 pp.
Nascimento et al., "Towards historical R-trees," Proc. of the ACM Symp. on Applied Computing, SAC, pp. 235-240, Feb. 1998, 6 pages.

(56) References Cited

OTHER PUBLICATIONS

Notice to File Corrected Application Papers U.S. Appl. No. 12/794,538, mailed on Mar. 11, 2010, Zheng et al. "Mining correlation Between Locations Using Location History", 2 pages.
Office Action for U.S. Appl. No. 13/195,496, mailed on Oct. 21, 2011, Yu Zheng, "Learning Transportation Modes from Raw GPS Data", 7 pages.
Office Action for U.S. Appl. No. 12/037,263, mailed on Oct. 8, 2010, Longhao Wang, "Indexing Large-Scale GPS Tracks", 7 pages.
Office action for U.S. Appl. No. 13/324,758, mailed on Feb. 26, 2016, Zheng et al., "Urban Computing of Route-Oriented Vehicles", 32 pages.
Office Action for U.S. Appl. No. 13/195,496, mailed on Feb. 7, 2012, Yu Zheng, "Learning Transportation Modes from Raw GPS Data ", 7 pages.
Office Action for U.S. Appl. No. 12/037,347, mailed on Mar. 1, 2011, Zheng, et al., System for Logging Life Experiences Using Geographic Cues, 18 pages.
Office Action for U.S. Appl. No. 12/037,263, mailed on Mar. 29, 2011, Longhao Wang, "Indexing Large-Scale GPS Tracks", 8 pages.
Office action for U.S. Appl. No. 14/587,270, mailed on Apr. 8, 2016, Zheng et al., "Determine Spatiotemporal Causal Interactions in Data", 7 pages.
International Preliminary Report on Patentability for PCT Application No. PCT/US2009/032778, mailed on Aug. 31, 2011.
Office Action for EP Patent Application No. 09 715 263.1, mailed on Feb. 16, 2015, "Learning Transportation Modes from Raw GPS Data", 5 pages.
Office Action mailed Oct. 9, 2015 for European Patent Application No. 09 715 263.1.
Papadopoulos et al., "Performance of Nearest Neighbor Queries in R-Trees", In ICDT, 1997, pp. 394-408.
Rao et al., "Making B+-tree Cache Sensitive in Main Memory," Proceedings of ACM SIGMOD Conference, 2000, pp. 475-486, 12 pages.
Salzberg et al., "Comparison of Access Methods for Time-Evolving Data", ACM Computing Surveys, 31(2), 1999, pp. 158-221, 64 pages.
Shachtman, Noah, "A Spy Machine of DARPA's Dreams," retrieved at <<http://archive.wired.com/techbiz/media/news/2003/05/58909?currentPage=all>>, Wired, May 20, 2003, 1 page.
Shachtman, Noah, "Pentagon Kills Lifelog Project," retrieved at <<http://www.wired.com/2004/02/pentagon-kills-lifelog-project/>>, Wired, Feb. 4, 2004, 6 pages.
Song et al., "Hashing Moving Objects," Proceedings of 2nd International Conference of Mobile Data Management, 2001, pp. 1-31.
Song et al., "SEB-tree: An Approach to Index Continuously Moving Objects," Proceedings of International Conference of Mobile Data Management, pp. 340-344, Jan. 2003.
Supplemental EP Search Report App. No. 09713700.4 mailed Jul. 17, 2012, 9 pages.
Tao et al., "MV3R-Tree: A Spatio-Temporal Access Method for Timestamp and Interval Queries," Proceedings of the International Conference on Very Large Data Bases, 2001, 10 pages.
Theodoridis et al., "On the Generation of Spatiotemporal Datasets," Advances in Spatial Databases, 6th International Symposium, Lecture Notes in Computer Science, Springer, 1999, 19 pages.
Wang et al., "A Flexible Spatio-Temporal Indexing Scheme for Large-Scale GPS Track Retrieval," MDM '08 9th International Conference on Mobile Data Management, IEEE, Beijing, 8 pages.
Office Action for U.S. Appl. No. 12/712,857, mailed on May 20, 2016, Yu Zheng, "Map-Matching for Low-Sampling-Rate GPS Trajectories", 14 pages.
Office Action for U.S. Appl. No. 13/324,758, mailed on Jul. 13, 2016, Zheng et al., "Urban Computing of Route-Oriented Vehicles", 7 pages.

* cited by examiner

POINTS ON THE TRAJECTORY TO GEOGRAPHICAL LOCATIONS

— 502

USER-SPECIFIED TRAVEL SEQUENCE

— 504

SEARCHING SIMILAR TRAJECTORIES BY LOCATIONS

BACKGROUND

A wide range of map-based services is being offered to users through web browsers, search engines, and as applications. Users may access the map-based services for street maps and a route planner for traveling by foot, vehicle, or public transport.

Requests for map-based services have become a common activity in people's daily lives. Many users access these services through a search engine on a computing device or on a personal navigation device. Users often request map-based services prior to driving to an appointment or an event at an unfamiliar location. However, conventional map-based services often determine routes solely with reference to a starting location to a destination location.

Other services, meanwhile, attempt to find user-requested routes using conventional trajectory searches. However, these trajectory map-based services often output planned routes that are based on a shape, a shape skeleton, a comparison, or other criteria. As such, these routes do not necessarily end precisely at a desired geographical location.

SUMMARY

This disclosure describes providing a trajectory route based on user input for multiple geographical locations. A trajectory route service receives global position system (GPS) logs (or other location-based logs) associated with respective devices, each of the GPS logs including trajectories connecting a set of geographical locations previously visited by an individual using a respective device. Next, a user requests a trajectory connecting a set of geographical locations of interest specified by the user. The trajectory route service calculates a proximal similarity between (1) the set of geographical locations of interest specified by the user, and (2) respective sets of geographical locations from the GPS logs. Based at least in part on the calculated proximal similarity, the trajectory route service constructs the requested trajectory with use of at least one of the trajectories from the GPS logs.

In another implementation, a trajectory route service receives a user input specifying multiple geographical locations of interest for planning a travel route. The trajectory route service accesses a trajectory route map constructed from GPS logs associated with respective individual devices, each of the GPS logs include trajectories that connect a set of geographical locations previously visited by an individual of a respective individual device. The trajectory route service computes an initial route by identifying trajectories from the GPS logs being closest in distance to each of the geographical locations of interest. The trajectory route service then refines the initial route by pruning and removing unqualified trajectories. The trajectory route service presents a route with a trajectory from the GPS logs that sequentially connects each of the multiple geographical locations of interest.

In yet another implementation, the trajectory route service receives a request for directions to multiple geographical locations and an order of travel to the multiple geographical locations. The trajectory route service presents a travel route in the order of travel, as specified by the user, to each of one or more geographical locations of interest.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure describes techniques for providing a travel route between a set of locations specified by a user. For instance, the user may desire to receive directions to a set of locations (e.g., locations A, B, and C), possibly without specifying a particular order of travel for the directions to these locations. After these desired locations are provided to a trajectory route service, the trajectory route service identifies an ideal route for travel to the multiple locations based in part on a travel sequence to the locations previously visited by individuals. To be able to provide the ideal route, the trajectory route service calculates a distance between the locations previously visited by individuals and the set of locations specified by the user. Thus, the trajectory route service presents the ideal route to the locations specified by the user based on the travel sequence from historical data.

In another implementation, the trajectory route service may further include an order of travel as specified by the user to one or more of multiple locations (e.g. locations A, B, and C). The user may desire directions starting at location A, travelling from location A to location C, and then travelling from location C to location B. For example, the user may want to view material at a new fabric store, attend a recital at a school, and meet friends for dinner at a restaurant that the user has not previously dined at. The trajectory route marks a travel route in the order as specified by the user, such as starting at location A, travelling from locations A to C, and travelling from locations C to B. Thus, the trajectory route service adjusts the travel sequence to each one of the locations of interest to satisfy the order of travel. The terms geographical locations of interest specified by the user and geographical locations of interest may be used interchangeably to describe the locations specified by the user.

As described herein, a trajectory route service constructs a trajectory or a travel route based on a relationship between global positioning system (GPS) trajectories and geographical locations of interest. The trajectory route service receives GPS logs associated with respective devices, each of the GPS logs including trajectories connecting a set of geographical locations previously visited by an individual of a respective device. The trajectory route service receives a request for a trajectory connecting the multiple geographical locations specified by a user. The trajectory route service calculates a proximal similarity between the set of geographical locations of interest specified by the user, and respective sets of geographical locations from the GPS logs.

While aspects of described techniques can be implemented in any number of different computing systems, environments, and/or configurations, implementations are described in the context of the following illustrative computing environment.

Illustrative Environment

Figure 1:
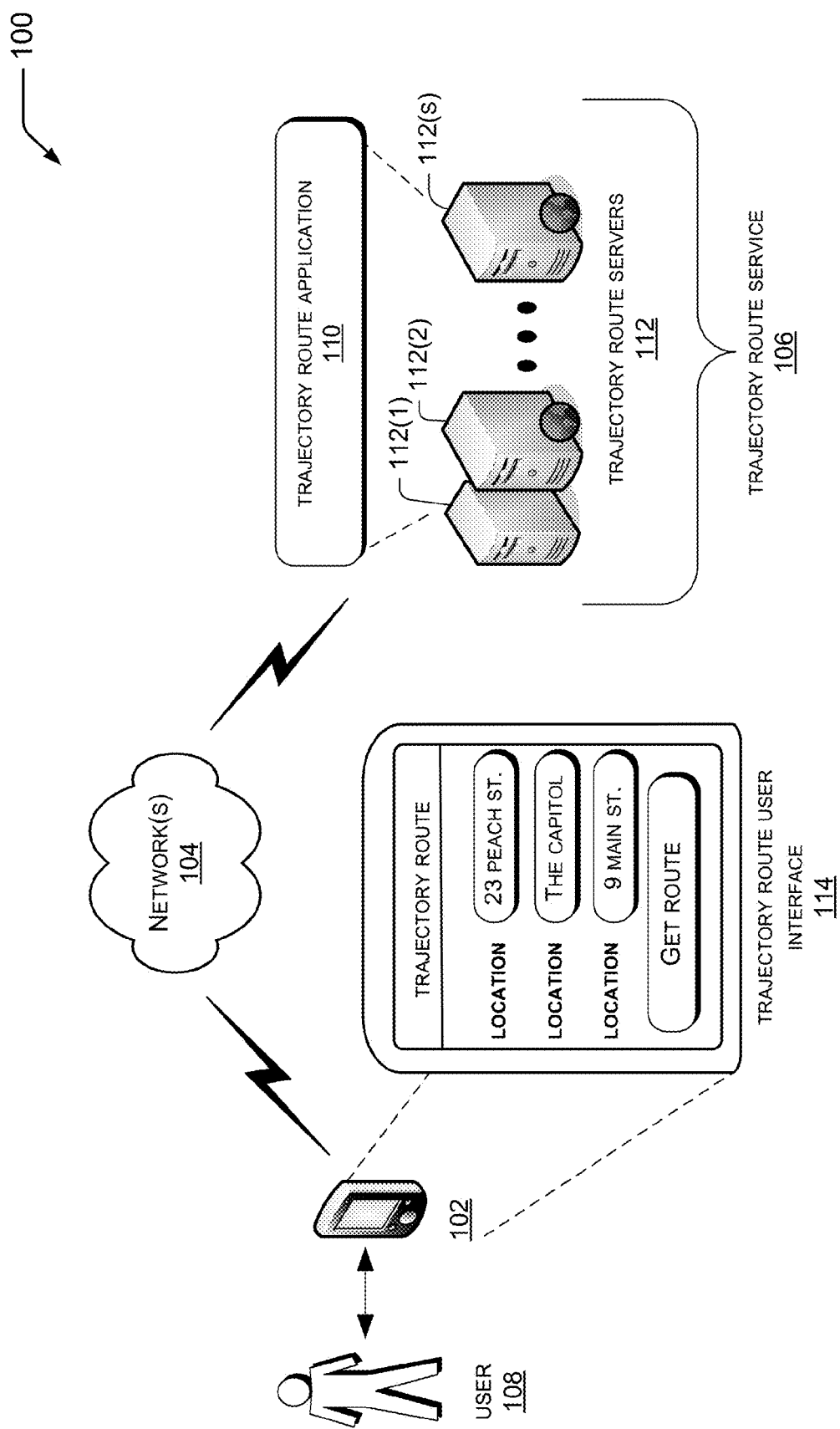
FIG. 1 illustrates an architecture to support an illustrative environment for providing a trajectory route to a user.

FIG. 1 illustrates an illustrative architectural environment 100 in which a trajectory or a travel route may be recommended for output on a computing device. The environment 100 includes an illustrative computing device 102, which is illustrated as a personal digital assistant (PDA). The computing device 102 is configured to connect via one or more network(s) 104 to access a trajectory route service 106 on behalf of a user 108. The computing device 102 may take a variety of forms, including, but not limited to, a portable handheld computing device (e.g., a personal digital assistant, a smart phone, a cellular phone), a personal navigation device, a laptop computer, a desktop computer, a portable media player, or any other device capable of connecting to one or more network(s) 104 to access the trajectory route service 106 for the user 108.

The network(s) 104 represents any type of communications network(s), including wire-based networks (e.g., public switched telephone, cable, and data networks) and wireless networks (e.g., cellular, satellite, WiFi, and Bluetooth).

The trajectory route service 106 represents an application service that may be operated as part of any number of online service providers, such as a search engine, a map service, a social networking site, or the like. Also, the trajectory route service 106 may include additional modules or work in conjunction with other modules to perform the operations discussed below. In an implementation, the trajectory route service 106 may be implemented at least in part by a trajectory route application 110 executed by trajectory route servers 112, or by a trajectory route application stored in memory of the computing device 102. Updates may be sent for the trajectory route application stored in memory of the computing device 102.

The trajectory route service 106 may be hosted on one or more trajectory route servers, such as server 112(1), 112(2), . . . , 112(S), accessible via the network(s) 104. The trajectory route servers 112(1)-(S) may be configured as plural independent servers, or as a collection of servers that are configured to perform larger scale functions accessible by the network(s) 104. The trajectory route servers 112 may be administered or hosted by a network service provider that provides the trajectory route service 106 to and from the computing device 102.

In the illustration, the computing device 102 includes a trajectory route user interface (UI) 114 that is presented on a display of the computing device 102. The trajectory route service 106, in operation with the trajectory route application 110, presents the UI 114 to receive user input and to present the trajectory or the travel route to the user 108. Thus, the UI 114 facilitates access to the trajectory route service 106 that provides the trajectory or the travel routes.

In an implementation, the UI 114 is a browser-based UI that presents a page received from the trajectory route service 106. The user 108 employs the trajectory route UI 114 when accessing the trajectory route service 106 to find a map for a particular region. In an implementation, the UI 114 may allow the user 108 to select one or more geographical locations of interest on the particular region in the map by clicking on these locations. In response, the trajectory service may determine a best trajectory amongst these locations, as discussed in detail below.

In another implementation, the trajectory route service 106, in operation with the trajectory route application 110, presents the UI 114 to receive textual or aural input from the user 108. For instance, the user 108 may type one or more geographical locations of interest and, in response, the trajectory service may determine a best trajectory amongst these locations. In the illustrated example, the user 108 may input multiple geographical locations of interest without any travel order in which the user would like to visit these locations. For example, the UI 114 illustrates a location of "23 Peach St.," another location identified by its landmark name such as "The Capitol," and another location "9 Main St." The trajectory route service 106 provides the trajectory or the travel route based on the trajectories from the GPS logs that are closest to each one of the geographical locations of interest, identified by a street name, a landmark name, or a specific point location that is of use or of interest to the user 108. The geographical location of interest or the specific point location may include but is not limited to a type of a location, such as a beach, a highway, a park, a camp site, an arena, a stadium, a name of an attraction, a name of a landmark, a name of a building, a name of an education facility, a street address, and the like. Furthermore, a number of geographical locations of interest that may be requested for one travel route may be ten or less.

In yet another implementation, the UI 114 may receive a request from the user 108 for a trajectory that is based on a specific travel sequence for the multiple geographical locations of interest. For instance, the user 108 may specify that she would like to visit "23 Peach St." first, before visiting "The Capitol" second, and then "9 Main St." In this instance, each one of the locations may have a number identifying a particular order of travel for the locations. That is, a first location may be indicated as "location 1 (L1)", a second as "location 2 (L2)", and so forth to show a desired travel sequence. In some instances, the order is specified explicitly by the user or by another user (e.g., a travel agent). In other instances, meanwhile, the order is determined based on other factors, such as a bus route, a travel agency's itinerary, traffic flow patterns of one way streets, traffic patterns, and the like.

In the illustration, the user 108 accesses the trajectory route service 106 via the network 104 using their computing device 102. The trajectory route service 106 presents the UI 114 to receive user input for geographical locations of interest and/or to provide the trajectory or the travel route for the multiple geographical locations of interest. In an implementation, the user 108 accesses a trajectory map for a particular region. Upon activating the particular region on the map, the user 108 may select the geographical locations of interest in the particular region, and the trajectory route service 106 provides a marked track for the trajectory route. In other implementations, the trajectory route may be used to plan daily routes, to plan for vacations, to analyze traffic flow patterns, to survey popular routes through attractions, to locate trajectories that are nearest to desired stationary places, and the like.

Figure 2:
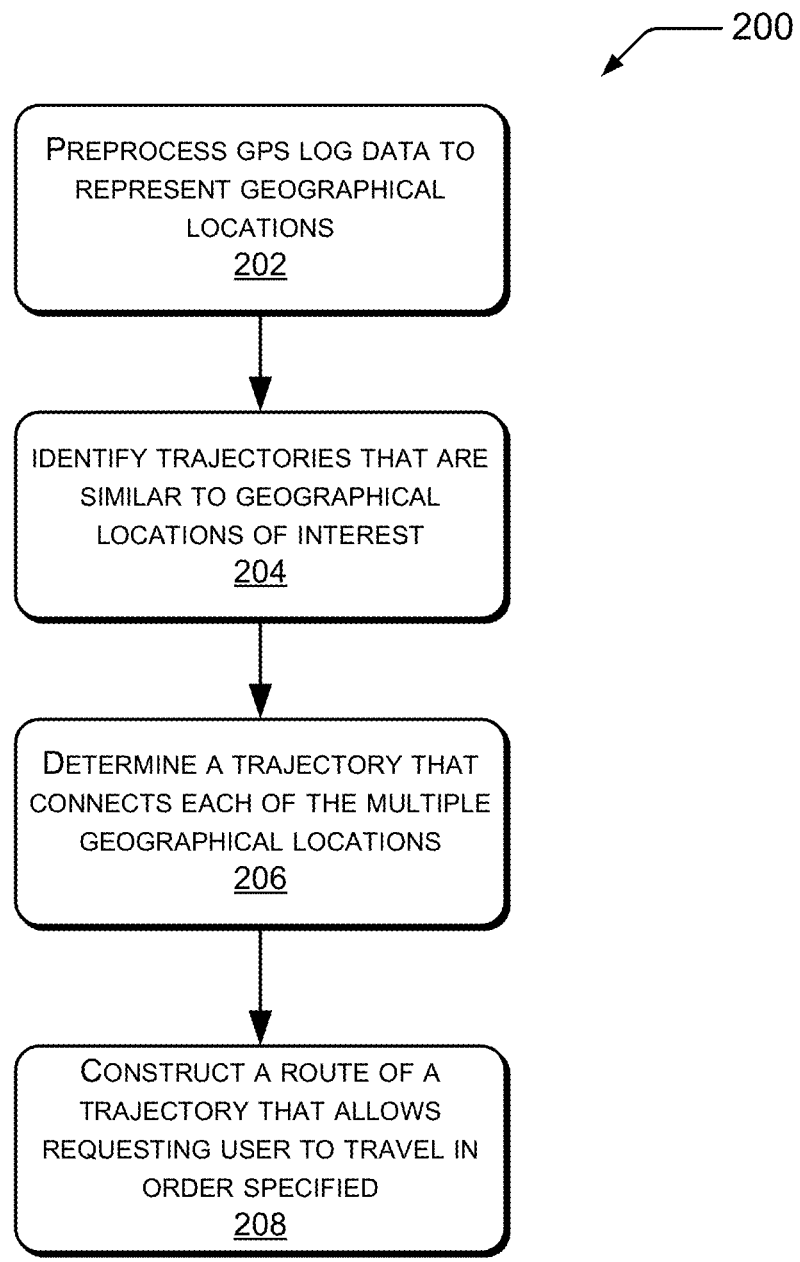
FIG. 2 is a flowchart showing illustrative phases for providing the trajectory route. The phases include preprocessing data, identifying trajectories that are similar, determining a trajectory connecting each of the geographical locations of interest, and constructing the trajectory route for use by the architecture of FIG. 1.

FIG. 2 is a flowchart showing an illustrative overview process 200 of high level functions performed by the trajectory route service 106. The process 200 may be divided into four phases, an initial phase to preprocess GPS logs 202 (or other location-based logs), a second phase to identify trajectories from GPS logs that are similar to the geographical locations of interest 204, a third phase to determine a best trajectory 206, and a fourth phase to construct a route to connect the multiple geographical locations of interest 208. All of the phases may be used in the environment of FIG. 1, may be performed separately or in combination, and without any particular order.

The first phase is to preprocess raw GPS logs to represent geographical locations 202. The trajectory route service 106 receives the GPS logs associated with respective individual devices. Each of the GPS logs includes trajectories connecting a set of geographical locations previously visited by an individual of a respective individual device.

The second phase is to identify trajectories from the GPS logs that are similar to the geographical locations of interest 204. The trajectory route service 106 calculates a proximal similarity between the set of geographical locations of interest and respective sets of geographical locations from the GPS logs.

The third phase is to determine the best trajectory connecting to each of the multiple geographical locations of interest 206. The trajectory route service 106 provides the best trajectory that connects the geographical locations of interest.

The fourth phase is to construct a route of a trajectory that allows requesting user to travel in order specified 208. The trajectory route service 106 provides the route in a travel sequence or allows a requesting user to travel to the multiple geographical locations of interest in an order specified by the user. Details of the phases are discussed in FIGS. 3-11 below.

Exemplary Processes

FIGS. 3, 4, 6, 7, and 8 are flowcharts showing illustrative processes for the phases mentioned above. The processes are illustrated as a collection of blocks in logical flowcharts, which represent a sequence of operations that can be implemented in hardware, software, or a combination. For discussion purposes, the processes are described with reference to the computing environment 100 shown in FIG. 1. However, the processes may be performed using different environments and devices. Moreover, the environments and devices described herein may be used to perform different processes.

For ease of understanding, the methods are delineated as separate steps represented as independent blocks in the figures. However, these separately delineated steps should not be construed as necessarily order dependent in their performance. The order in which the process is described is not intended to be construed as a limitation, and any number of the described process blocks maybe be combined in any order to implement the method, or an alternate method. Moreover, it is also possible for one or more of the provided steps to be omitted.

Preprocess GPS Log Data

Figure 3:
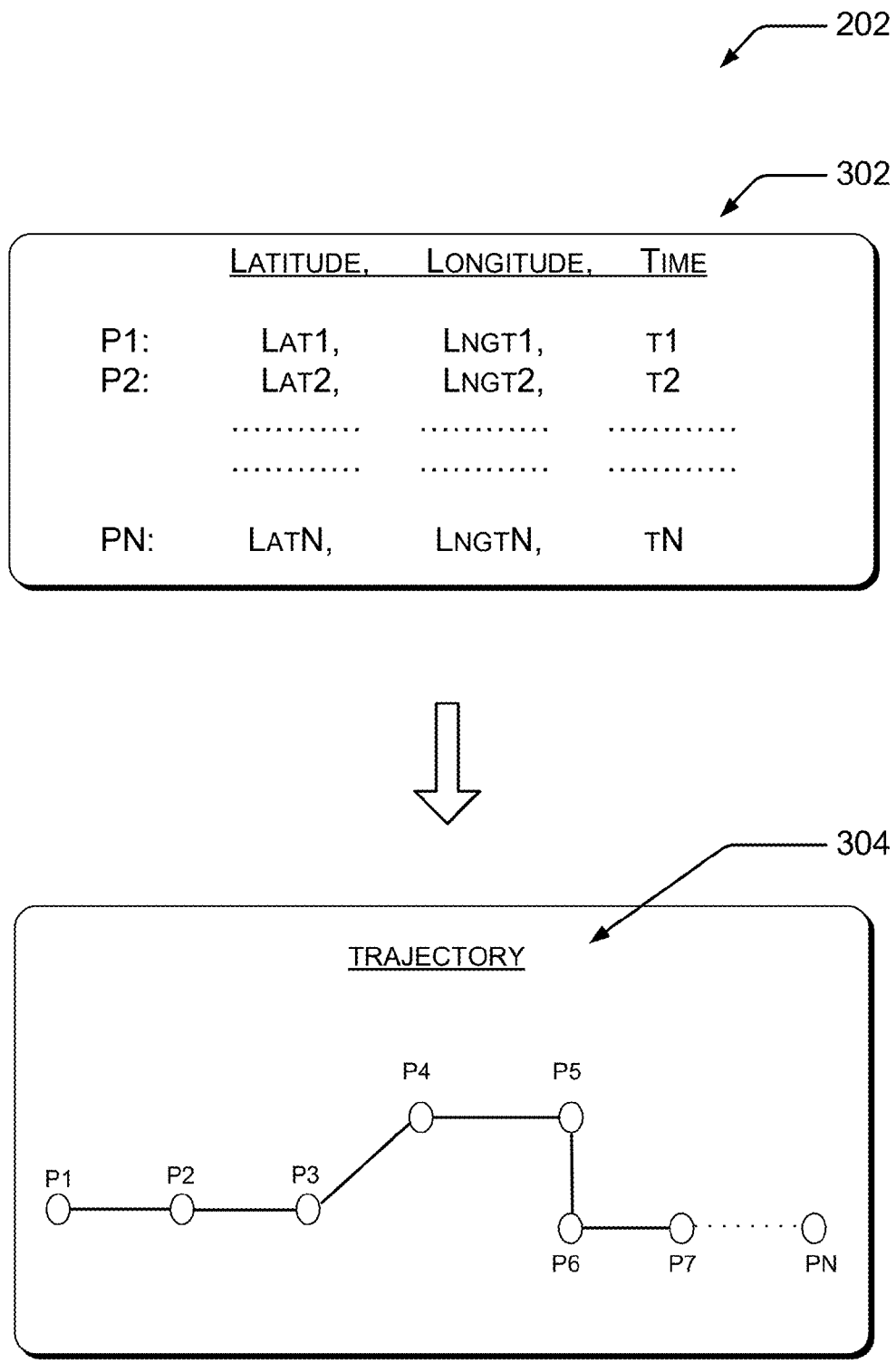
FIG. 3 illustrates an illustrative process of preprocessing GPS log data.

FIG. 3 illustrates illustrative process for performing the phase 202 of preprocessing GPS log data. At 302, the trajectory route service 106 obtains, collects, or receives raw GPS log data (or other location based log) of geographical locations of individual users. The logs 302 may be obtained from GPS devices, tracking units, mobile phones, or any other device, as long as these devices are located in close proximity to each of the individuals. The GPS devices may be set to automatically track the position of the GPS device at regular intervals. Each of the individual users is asked prior to tracking or to sharing their movements and locations if their GPS data may be included as a part of a GPS data collection. The options are that the individual user may choose to opt-in to participate or to opt-out to not participate in the tracking or sharing of their GPS data. As such, the techniques track the GPS data after receiving user consent.

In another implementation, the trajectory route service 106 may obtain GPS logs from GPS-log driven applications, social networks, or services on the web. Each individual user may be equipped with a GPS device for tracking data. The device may include a GPS navigation device, a GPS phone, or any other type of GPS sensor that collects GPS log data at a high sampling rate, such as every two to eight seconds per point. The GPS data may be uploaded to the web by the users to show their positions and to share their GPS locations by agreeing to opt-in to participate in the data collection.

The GPS log 302 is generally a collection of a series of points represented points containing a latitude (Lat), a longitude (Lngt) and a time (T).

The trajectory route service 106 sequentially connects the points into a GPS trajectory 304. The trajectory 304 may be represented by:

$$R=(p_1,p_2,\ldots,p_n)$$

Where n is a number of points in the trajectory, n=8.

Identify Points on Trajectory to Represent Geographical Locations

Figure 4:
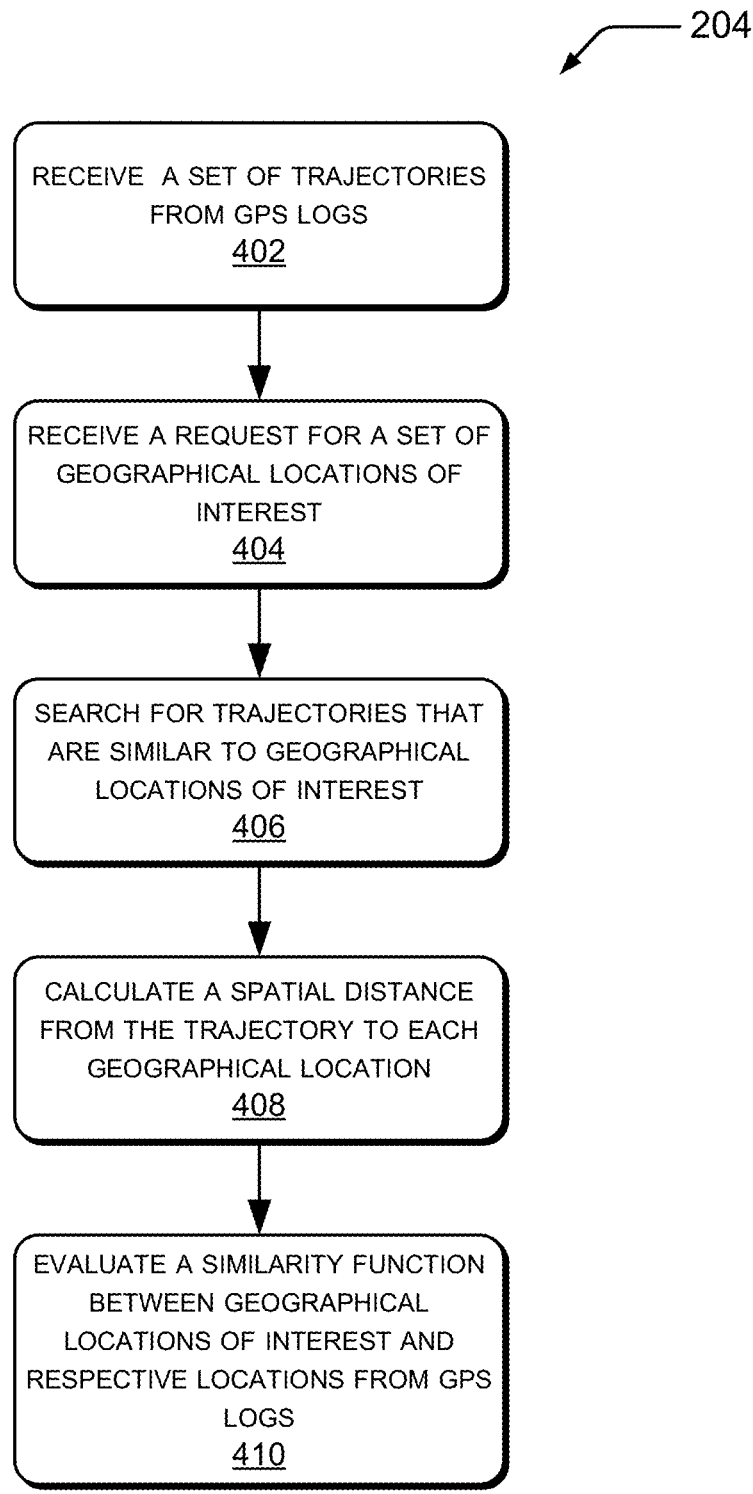
FIG. 4 is a flowchart showing an illustrative process of identifying trajectories from the GPS logs that are similar to the geographical locations of interest.

FIG. 4 illustrates an illustrative process of the phase 204 of identifying points on a trajectory from the GPS logs to represent the geographical locations of interest. The trajectory route service 106 receives a set of trajectories from GPS logs 402, as described in FIG. 3.

Next, the trajectory route service 106 receives a request for a set of geographical locations of interest 404 specified by the user 108 through user input on the map or by text. The set of geographical locations of interest specified by the user 108 may be represented as:

$$Q=\{q_1,q_2,\ldots,q_m\}$$

where m is a number of locations. The geographical locations of interest Q may be assigned with a travel sequence, if specified by the user 108. If there is a travel sequence, Q is treated as a sequence of locations from $q_1$ to $q_m$.

The trajectory route service 106 searches for trajectories from the GPS database that are similar to the geographical locations of interest 406. In order to identify how well a trajectory from the GPS logs connects the geographical locations of interest, a distance (e.g., spatial) is measured with a value or distance amount and a similarity function or a proximal similarity are calculated. For example, at least one trajectory from the GPS logs is determined based on the at least one trajectory connecting a set of geographical locations from the GPS logs having a highest calculated proximal similarity to the set of geographical locations of interest specified by the user The trajectory route service 106 calculates a spatial distance from the trajectory from the GPS logs to each geographical location of interest 408. The trajectory route service 106 calculates the spatial distance by using the following equation:

$$Dist_q(q_i, R) = \min_{p_j \in R} \{Dist_e(q_i, p_j)\}$$

where R represents the trajectory, $R=\{p_1, p_2, \ldots, p_l\}$. On the right side of the equation, $Dist_e(q_i, p_j)$ represents an Euclidean distance between a location of interest, $q_i$, and a trajectory point, $p_i$. The Euclidean distance, $Dist_e(q_i, p_i)$ is a measured amount of distance from $q_i$ to any point $p_i$ on R. If a small, short, or a closest distance has been identified, the $<q_i, p_i>$ is referred to as a matched pair where $p_j$ is a nearest point on R to $q_i$. However, $p_j$ may be matched with multiple geographical locations.

The trajectory route service 106 evaluates the similarity function or the proximal similarity between the set of geographical locations of interest and the respective sets of geographical locations from the GPS logs, based on the trajectory from the GPS logs 410. The similarity is evaluated by using the following equation:

$$Sim(Q,R) = \Sigma_{i=1}^{m} e^{-Dist_q(q_i, R)}.$$

The exponential function $e^{-Dist_q(q_i, R)}$ is used to measure a contribution of each matched pair to Sim(Q, R). The contribution from each matched pair may be determined by assigning weights to each pair. A larger weight may be assigned to a matched pair that is closer in distance while a smaller weight or less weight may be assigned to a matched pair that is further apart. The assigned weight results in an exponential decreasing of contribution as $Dist_q(q_i, R)$ increases. Based on the weight assigned, the trajectory from the GPS logs that is within a threshold distance to each of the geographical locations of interest is considered to be "similar."

In an implementation, the trajectory route service 106 may determine whether a distance between the geographical location of interest and the point in the trajectory from the GPS logs is greater than or less than a predetermined threshold. In an event that the distance is greater than the predetermined threshold, the trajectory route service 106 will refrain from including the trajectory in a candidate set of GPS trajectories. In an event that the distance is less than the predetermined threshold, the trajectory route service 106 may include the trajectory in the candidate set of GPS trajectories.

Figure 5:
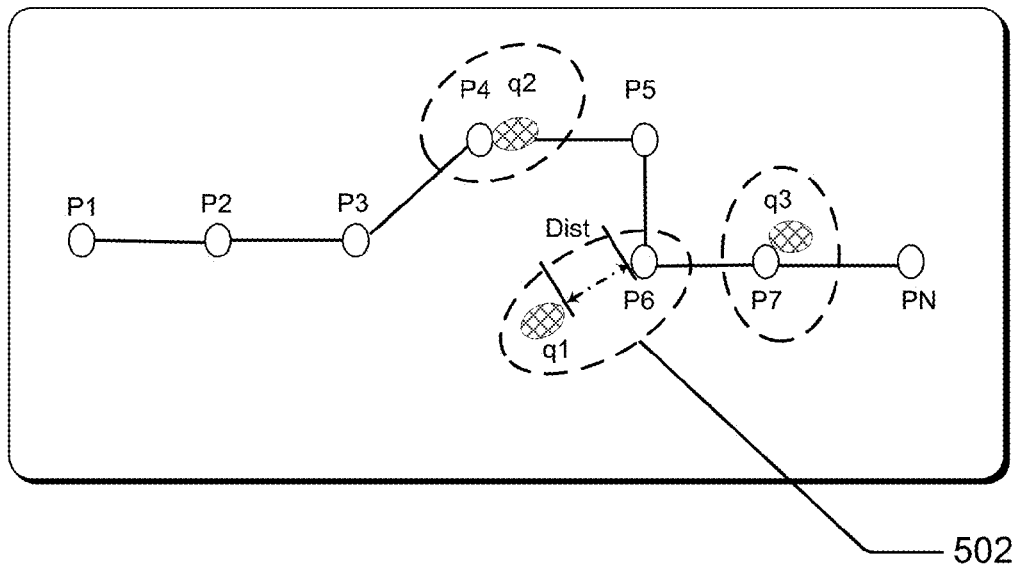
FIG. 5 illustrates examples of diagrams of matching points of a trajectory from the GPS logs to each of one or more geographical locations.
Figure 5:
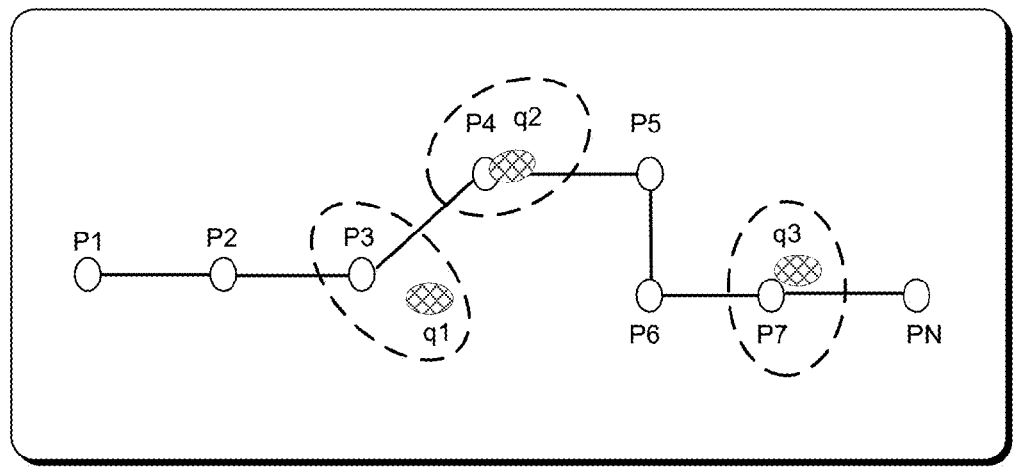

FIG. 5 illustrates an illustrative process 500 of identifying trajectories by calculating the closest distance of the trajectory points to the geographical locations of interest. The points on trajectory R are shown as $R=p_2, p_3, p_4, p_5, p_6, p_7, p_n$). For example, the geographical locations of interest are identified as q1, q2, and q3, represented by oval shapes in a hatchet pattern in 500. The geographical locations of interest identified as q1, q2, and q3 are matched to the closest trajectory points, $p_6$, $p_4$, and $p_7$, respectively as shown at 500. The dashed ellipses illustrate the matched pairs (e.g., matched pairs are points of the trajectory from the GPS logs closest to the geographical locations of interest). For example, the distance values for the matched pairs are: $Dist_e(q_1, p_6)=1.5$, $Dist_e(q_2, p_4)=0.1$, and $Dist_e(q_3, p_7)=0.1$. Thus, the similarity function may be represented as: $Sim(Q, R) = e^{-Dist_e(q_1, p_6)} + e^{-Dist_e(q_2, p_4)} + e^{-Dist_e(q_3, p_7)} = e^{-1.5} + e^{-0.1} + e^{-0.1}$. The distance measurement for $Dist_e(q_1, p_6)=1.5$ is shown at 502.

Proceeding to 504 is an illustrative travel sequence specified by the user 108 for the geographical locations of interest. The matched points on the trajectory from the GPS logs may help satisfy the order that is specified by the user. However, the trajectory route service 106 may adjust the matched points, based on a travel sequence to the geographical locations in the order specified by the user 108. For example, the matching no longer occurs since a matched point $p_j$ for the geographical location of interest $q_i$ may not be the nearest point to $q_i$ any longer. For example, the user 108 may specify the travel sequence of the locations, represented as $q_1 \rightarrow q_2 \rightarrow q_3$. However, the actual visiting order of the matched points on R is from $p_4 \rightarrow p_6 \rightarrow p_7$, assuming that the trajectory, R travels from left to right. The travel sequence is no longer from $p_6 \rightarrow p_4 \rightarrow p_7$. These matched pairs no longer conform to the user specified order, causing the trajectory route service 106 to adjust the matching of trajectory points to satisfy the order of travel requested by the user 108.

Shown at 504, $q_1$ is re-matched with $p_3$ and the new travel sequence is from $p_3 \rightarrow p_4 \rightarrow p_7$, which satisfies the user-specified order. The goal is to maximize a sum of the contribution of each matched pair, based on the weights, while still keeping the order of visits. The sum of the contribution of the pairs, $<q_1, p_3>$, $<q_2, p_4>$, and $<q_3, p_7>$ is maximized among all of the possible combinations that satisfy the order of travel.

For the order specified by the user 108, an equation to calculate the similarity function with order $Sim_o(Q, R)$ for the geographical locations of interest is:

$$Sim_o(Q, R) = \max \begin{cases} e^{-Dist_e(Head(Q), Head(R))} + \\ Sim_o(Rest(Q), R) \\ Sim_o(Q, Rest(R)) \end{cases}$$

where Head(*) is a first point of *, where $Head(Q)=q_1$ and Rest(*) indicates that a rest part of * after removing the first point, e.g., $Rest(Q)=\{q_2, q_3, \ldots, q_m\}$. The equation for $Sim_o(Q, R)$ defines maximal solutions for subproblems: $Sim_o(Rest(Q), R)$ and $Sim_o(Q, Rest(R))$. Therefore, once Head(Q) and Head(R) match, $e^{-Dist_e(Head(Q), Head(R))}$ may be summed up to the similarity function and shift to the matching of the rest of Q by using $Sim_o(Rest(Q), R)$. Head(R) is retained for a next round of comparison as a trajectory point may be matched with more than one geographical locations of interest.

Dynamic programming is used to solve the similarity and to keep the matched trajectory points in a same order as the geographical locations of interest.

The equation to evaluate the similarity function is:

$$Similarity(Q, R_i)_{R_j \in T} \geq Similarity(Q, R_j)_{R_j \in T-T'}$$

where Similarity $(Q, R_i)=Sim(Q, R_i)$ if no order is specified. If there is an order-specified, a subscript of o is used, Similarity $(Q, R_i)=Sim_o(Q, R_i)$.

The trajectory route service 106 may search for trajectories from the GPS logs by retrieving trajectory points from the GPS logs that are within a threshold distance to each of the multiple geographical locations of interest, a trajectory point represents a geographical location previously visited by the user of a respective user device. The trajectory route service 106 identifies the retrieved trajectory points that are within an intersection of the multiple geographical locations of interest. Furthermore, the trajectory route service 106 may determine that the trajectory points that are within the intersection as being closest in distance to the multiple geographical locations of interest.

Identifying "Best" Trajectory

Figure 6:
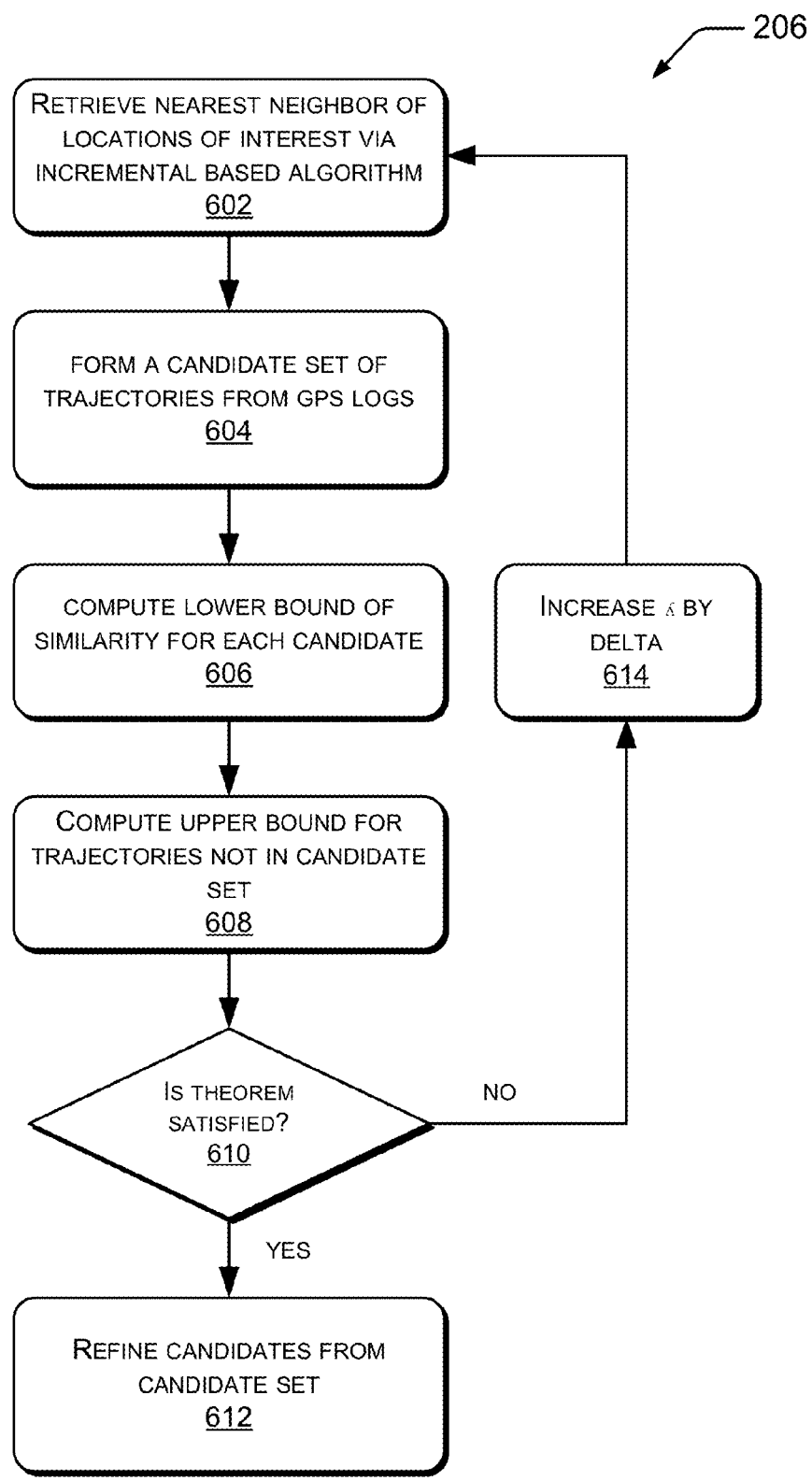
FIG. 6 is a flowchart showing an illustrative process of calculating a proximal similarity between (1) the set of geographical locations of interest specified by the user, and (2) respective sets of geographical locations from the GPS logs.

FIG. 6 illustrates an illustrative process 206 of determining the best trajectory to connect the geographical locations of interest. The trajectory route service 106 may use a spatial index that utilizes a rectangle-tree (R-tree) to search for trajectories from the GPS logs, followed by an in-depth study on further adaption and optimization. The R-tree includes tree data structures for indexing multi-dimensional information, such as the coordinates of the geographical locations. The R-tree splits space with hierarchically nested polygons, such as rectangles. Here, points of all the database trajectories are simply indexed by one single R-tree, while points from the same trajectory are further connected by a double linked list.

The trajectory route service 106 retrieves a nearest neighbor ($\lambda$-NN) of each geographical location of interest by using an incremental based k-nearest neighbor (k-NN) algorithm 602. This is assuming there is a set of geographical locations of interest of $Q=\{q_1, q_2, \ldots, q_m\}$, without specifying the order of travel for the multiple geographical locations of interest. The trajectory route service 106 retrieves the $\lambda$-NN of each geographical location of interest ($\lambda>0$) using the following:

$$\lambda - NN(q_1) = \{p_1^1, p_1^2, \ldots, p_1^\lambda\}$$

$$\lambda - NN(q_2) = \{p_2^1, p_2^2, \ldots, p_2^\lambda\}$$

$$\ldots$$

$$\lambda - NN(q_m) = \{p_m^1, p_m^2, \ldots, p_m^\lambda\}.$$

The trajectory route service 106 forms or creates a candidate set of trajectories from the GPS logs 604. A set of trajectories that have been scanned from the GPS logs contain at least one point in $\lambda$-NN($q_i$) that is part of the candidate set $C_i$ for identifying the "best" trajectory (k-BT) that connects each of the multiple geographical locations of interest. There may be several $\lambda$-NN points that belong to the same trajectory, thus a cardinality $|C_i| \geq \lambda$ may exist. The trajectory route service 106 merges the candidate sets that have been generated by all of the nearest neighbor searches $\lambda$-NN($q_i$). As a result of the merging, there may be a possibility of very different trajectories as candidates for the best trajectory, based on the following:

$$C = C_1 \cup C_2 \cup \ldots \cup C_m = \{R_1, R_2, \ldots, R_f\}$$

where f is a number of trajectories. For each candidate trajectory $R_x (\notin [1, f])$ that is within the candidate set C, the trajectory must contain at least one point whose distance to the corresponding geographical location of interest is determined. For example, if $R_x \in C_i$ ($C_i \subseteq C$), then the $\lambda$-NN of $q_i$ must include at least one point on $R_x$, and the shortest distance from $R_x$ to $q_i$ is known. As a result, at least one matched pair of points between $R_x$ and some $q_i$ is identified. Thus, there may be a subset of trajectories from the candidate set that are matched to the at least the geographical location of interest specified by the user.

The trajectory route service 106 computes a lower bound LB of similarity function or proximal similarity for each candidate 606. The LB may be computed for each candidate $R_x (\notin [1, f])$ by using the found matched pairs:

$$LB(R_x) = \Sigma_{i \notin [1,m] \wedge R_x \in C_i} (\max_{j \notin [1,\lambda] \wedge p_i^j \in R_x} \{e^{-Dist_e(q_i, p_i^j)}\}).$$

Here, $\{q_i | i \in [1, m] \wedge R_x \in C_i\}$ denotes a subset of geographical locations of interest that has already been matched with some point on $R_x$, and the $p_i^j$ which achieves the maximum $e^{-Dist_e(q_i, p_i^j)}$ with respect to $q_i$ is the point on $R_x$ that is closest to $q_i$. Thus, $\max_{j \notin [1,\lambda] \wedge p_i^j \in R_x} \{e^{-Dist_e(q_i, p_i^j)}\} = e^{-Dist_e(q_i, R_x)}$. The equation $LB(R_x) = \Sigma_{i \notin [1,m] \wedge R_x \in C_i} (e^{-Dist_e(q_i, R_x)})$ is not greater than $\Sigma_{i=1}^{m} e^{-Dist_e(q_i, R_x)}$, since it only takes the matched pairs that have been identified, into account. Thus, LB ($R_x$) may lowerbound the exact similarity Sim(Q, $R_x$) that is defined in $Sim(Q, R) = \Sigma_{i=1}^{m} e^{-Dist_e(q_i, R)}$. However, if $R_x \notin C_i$, then none of the trajectory points have been scanned by $\lambda$-NN($q_i$).

The trajectories that are not contained in the candidate set C, are indicative that the trajectories have not been scanned by any of the nearest neighbor $\lambda$-NN searches, and any point on them may have a distance to qi no less than the distance of the $\lambda^{th}$ NN of $q_i$ (i.e., $Dist_e(q_i, p_i^\lambda)$). Therefore, the trajectory route service 106 computes an upper bound UB for of similarity function or proximal similarity for all of the non-scanned trajectories 608 (or trajectories that are not identified to be included in the candidate set). The equation to compute the upper bound UB is: $UB_n = \Sigma_{i=1}^{m} e^{-Dist_e(q_i, p_i^\lambda)}$. Based on the results of the lower bound LB and the upper bound UB, the trajectory route service 106 applies a pruning mechanism to remove the unqualified candidates from the candidate set. The trajectory route service 106 identifies the trajectories that may be used as the best trajectory. The pruning mechanism is to avoid scanning the whole trajectory database which utilizes more time and cost. The search space for the trajectories is restricted by using the above method.

The trajectory route service 106 uses a theorem to determine if the number of best connected trajectory (k-BT) is included as part of the candidate set. The theorem is based on without specifying the order of travel to the geographical locations of interest. The trajectory route service 106 may receive a subset of a number of trajectories C' from the candidate set C after searching the $\lambda$-NN of each geographical location of interest. The result found may be $\min_{R_x \in C'} \{LB(R_x)\} \geq UB_n$, then the number of best connected trajectories may be included in the candidate set C. The proof is for any $R_x \in C'$, $Sim(Q, R_x) \geq LB(R_x)$ and for any $R_y \notin C$ (i.e. $R_y \in \overline{C}$), $UB_n \geq Sim(Q, R_y)$. When $\min_{R_x \in C'} \{LB(R_x)\} \geq UB_n$, the trajectory route service 106 may determine that:

$$\forall R_x \forall R_y (R_x \in C' \wedge R_y \notin C) \rightarrow (Sim(Q, R_x) \geq Sim(Q, R_y)).$$

Based on this, the connected trajectories result may not be from $\overline{C}$ but are from the candidate set C.

The trajectory route service 106 updates k maximal lower bounds, k-LB[ ] $\subset$ LB[ ]. The trajectory route service 106 determines if the theorem is satisfied at 610. If the theorem is satisfied, then the k-BT that is included in the candidate set and the non-scanned trajectories beyond the candidate set may be safely filtered. Then the trajectory route service 106 proceeds to 612.

The trajectory route service 106 refines the candidates from the candidate set 612. Detailed discussion of the refining follows in FIG. 7.

Returning to 610, if the theorem is not satisfied, the process moves to the right side 614. If the best connected trajectory k-BT is not found in the candidate set, the trajectory route service 106 increases $\lambda$ by a $\Delta$ 614 for the trajectory searches to locate or to ensure that the best connected trajectory is contained in the candidate set. If λ is set to be a very large value, the possibility is that the connected trajectories results will all be retrieved, but the search space may be huge, which may take a longer time period. However, a smaller λ may not be sufficient to ensure that the connected trajectories results are included in the candidate set, leading to a false dismissal. Rather, than choosing a fixed λ, the trajectory route service 106 applies an incremental number of nearest neighbor algorithm by increasing λ by a Δ for a next round of iterations. The process returns to 602 and starts another iteration. This k-NN algorithm provides an efficient retrieval of the candidate trajectories with a filtering and refinement mechanism.

The k-NN algorithm for computing, refining, and pruning steps of FIG. 6 is shown below:

| k-NN Algorithm Identify Connected Trajectories |
| --- |
| Input: k,Q |
| Output: k-BT |
| 1.  Candidate Set C; |
| 2.  Upperbound $UB_n$; |
| 3.  Lowerbounds [LB[ ], k - LB[ ]] |
| 4.  Integer λ← k; |
| 5.  While true do |
| 6.     For each $q_i \in Q$ from $q_1$ to $q_m$ do |
| 7.        λ -NN($q_i$) ← KNN($q_i$,λ); |
| 8.        $C_i$ ← trajectories scanned by λ -NN($q_i$); |
| 9.        C ← $C_1 \cup C_2 ... \cup C_m$ |
| 10.    if \|C\| ≥ k then |
| 11.       compute LB [ ] for all trajectories in C; |
| 12.       k-LB[ ]←LB[ ].topK( ); |
| 13.       if k-LB[ ].min≥$UB_n$ then |
| 14.          k-BT← refine (C); |
| 15.          return k-BT; |
| 16. λ←λ + Δ; |

Figure 7:
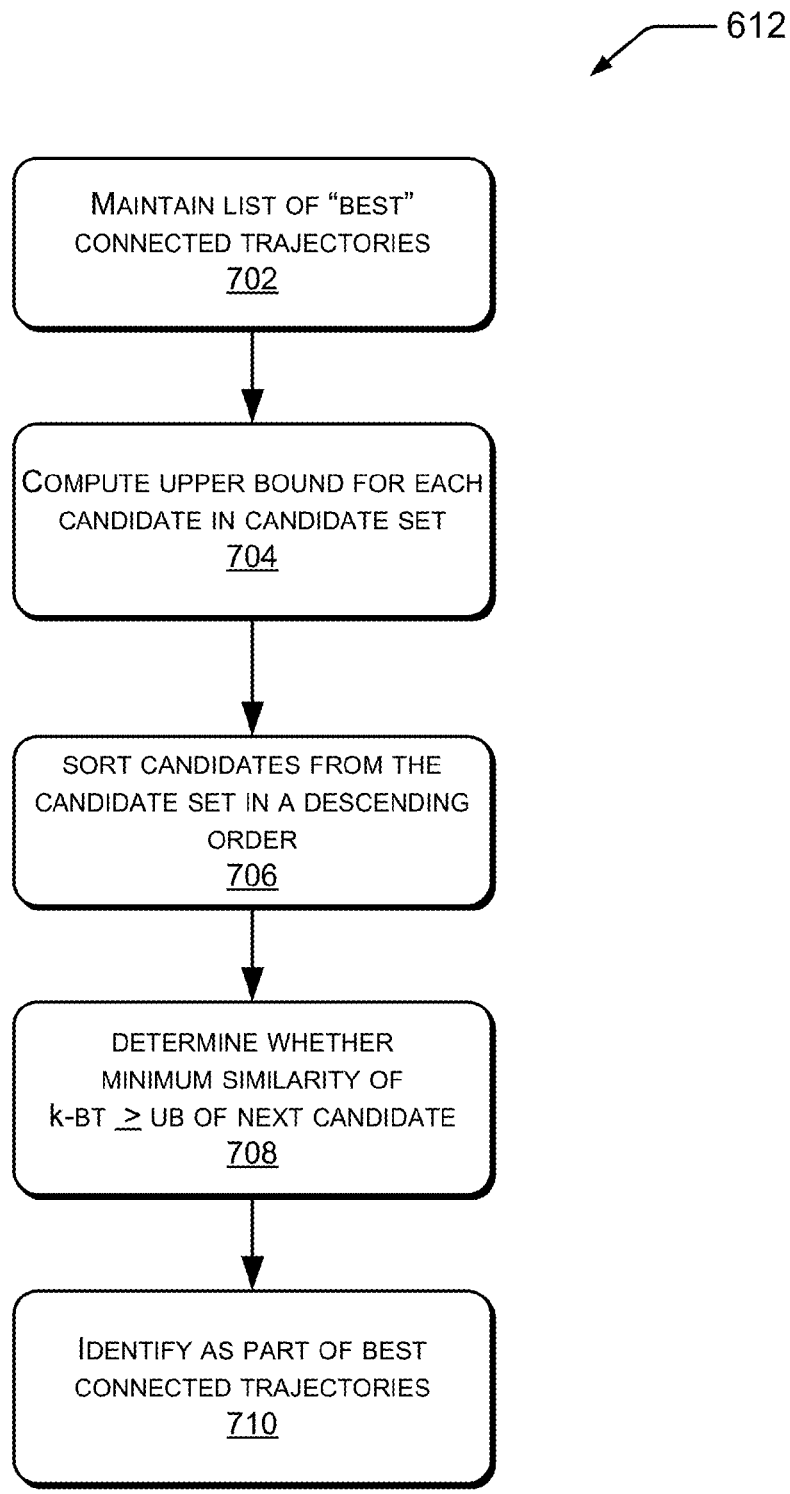
FIG. 7 is a flowchart showing an illustrative process of refining and pruning unqualified trajectories in constructing a requested trajectory or a travel route.

FIG. 7 illustrates an illustrative process 612 of refining candidates from the candidate set. The trajectory route service 106 maintains a list of the best connected trajectories identified and the similarity values 702 from the process described in FIG. 6.

The trajectory route service 106 computes the UB for each candidate in the candidate set 704. The equation to compute the UB for each candidate is:

$$UB(R_x) = \sum_{i \in [1,m] \wedge R_x \in C_i]} \max_{j \in [1,\lambda] \wedge p_i^j \in R_x} \left\{ e^{-Dist_e(q_i, p_i^j)} \right\} + \sum_{i \in [1,m] \wedge R_x \notin C_i} (e^{-Dist_e(q_i, p_i^\lambda)})$$

where $R_x \notin C = \{C_1 \cup C_2, \ldots, \cup C_m\}$. For a geographical location of interest within $q_i | i \in [1,m] \wedge R_x \in C_i$, the closest point on $R_x$ to is found by the λ-NN($q_i$) search, and accumulate to $UB(R_x)$, the contribution of the matched pair, $\langle q_i, closestPoint \rangle$. Otherwise, for a $q_i$ that the nearest neighbor search has not covered any point on $R_x$ (i.e. $R_x \notin C_i$), the trajectory route service 106 considers that the current $\lambda^{th}$ NN of $q_i$ (i.e. $p_i^\lambda$) may be closer than the matched point, and accumulate the contribution of the $\langle q_i, p_i^\lambda \rangle$ pair to UB ($R_x$).

Thus, the similarity or proximal similarity may be defined as:

$$Sim(Q, R_x) - UB(R_x) = \sum_{i=1}^{m} e^{-Dist_q(q_i, R_x)} -$$
$$\sum_{i \in [1,m] \wedge R_x \in C_i} (e^{-Dist_q(q_i, R_x)}) - \sum_{i \in [1,m] \wedge R_x \notin C_i} \left(e^{-Dist_e(q_i, p_i^\lambda)}\right) =$$
$$\sum_{i \in [1,m] \wedge R_x \notin C_i} \left(e^{-Dist_q(q_i, R_x)} - e^{-Dist_e(q_i, p_i^\lambda)}\right) \leq 0.$$

For any candidate $R_x$ within C, the similarity function or the proximal similarity may be shown as $Sim(Q, R_x) \leq UB(R_x)$. The algorithm for refining the candidate set is shown below.

The trajectory route service 106 sorts the candidates from the candidate set in a descending order of UB 706.

The trajectory route service 106 determines whether the minimum similarity of the best connected trajectories is greater than or equal to the UB of the next trajectory candidate, $R_{x+1}$ 708. If this occurs, the trajectory route service 106 identifies the trajectories as part of being included in the best connected trajectories 710. The trajectory route service 106 returns the connected trajectories as a final result.

The algorithm to compute refining candidates from the candidate set 612 is shown below:

| Algorithm Refine Candidate Set C |
| --- |
| 1.  k-BT← SortedList(k); |
| 2.  compute UB for each candidate in C; |
| 3.  sort candidates in C by UB in descending order; |
| 4.  for x=1 to \|C\| do |
| 5.     compute Sim ($Q,R_x$) by traversing $R_x$ ; |
| 6.     if x ≤ k then k-BT.insert ($R_x$,Sim($Q,R_x$)); |
| 7.     else |
| 8.        if x = \|C\| or k - BT.min ≥ $UB(R_{x+1})$ then |
| 9.           return k-BT; |
| 10.       if Sim($Q,R_x$) > k - BT.min then |
| 11.          k-BT.removedLast( ); |
| 12.          K-BT.insert ($R_x$,Sim($Q,R_x$)). |

Construct Trajectory Route and Examples of Trajectory Routes

Figure 8:
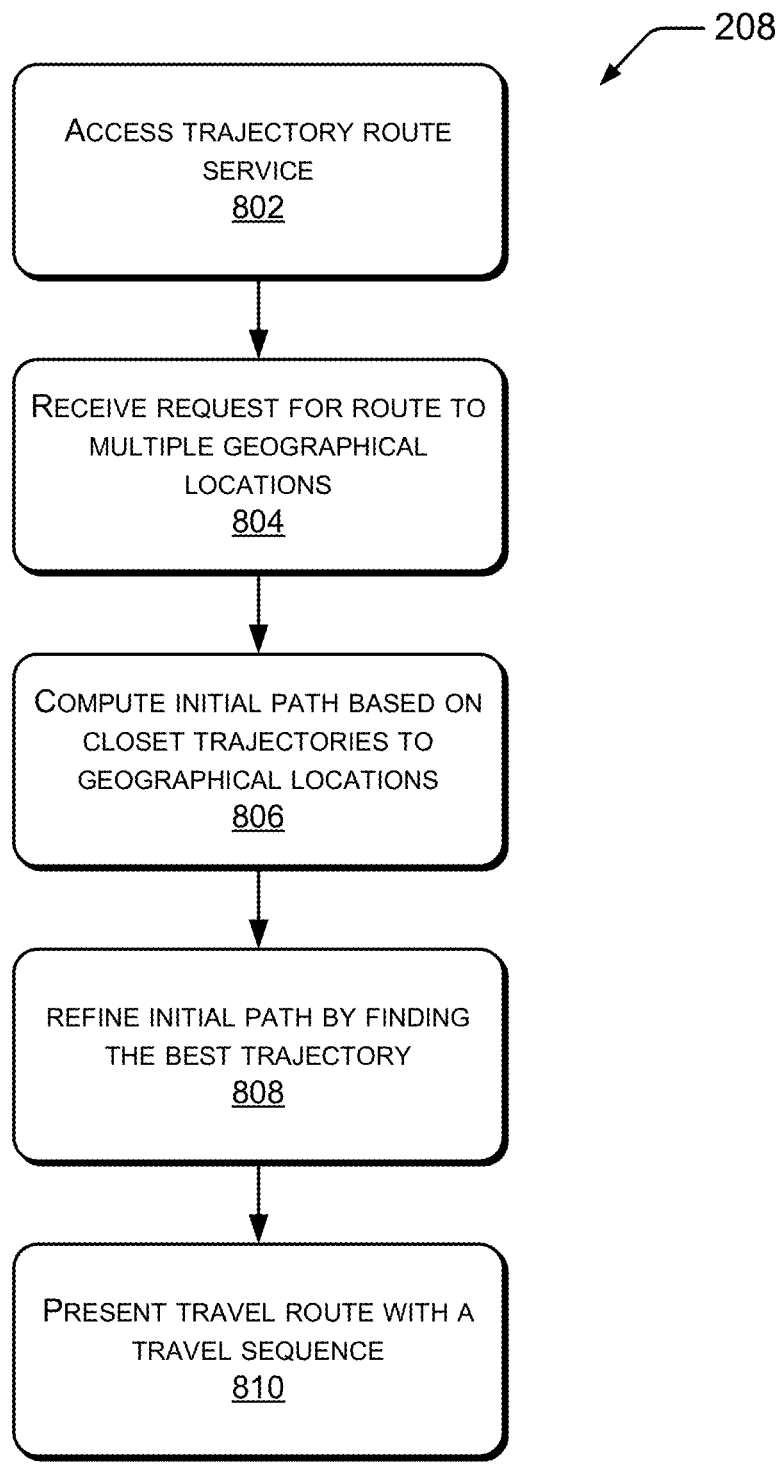
FIG. 8 illustrates an illustrative process of constructing a travel route in response to receiving user input.
Figure 9:
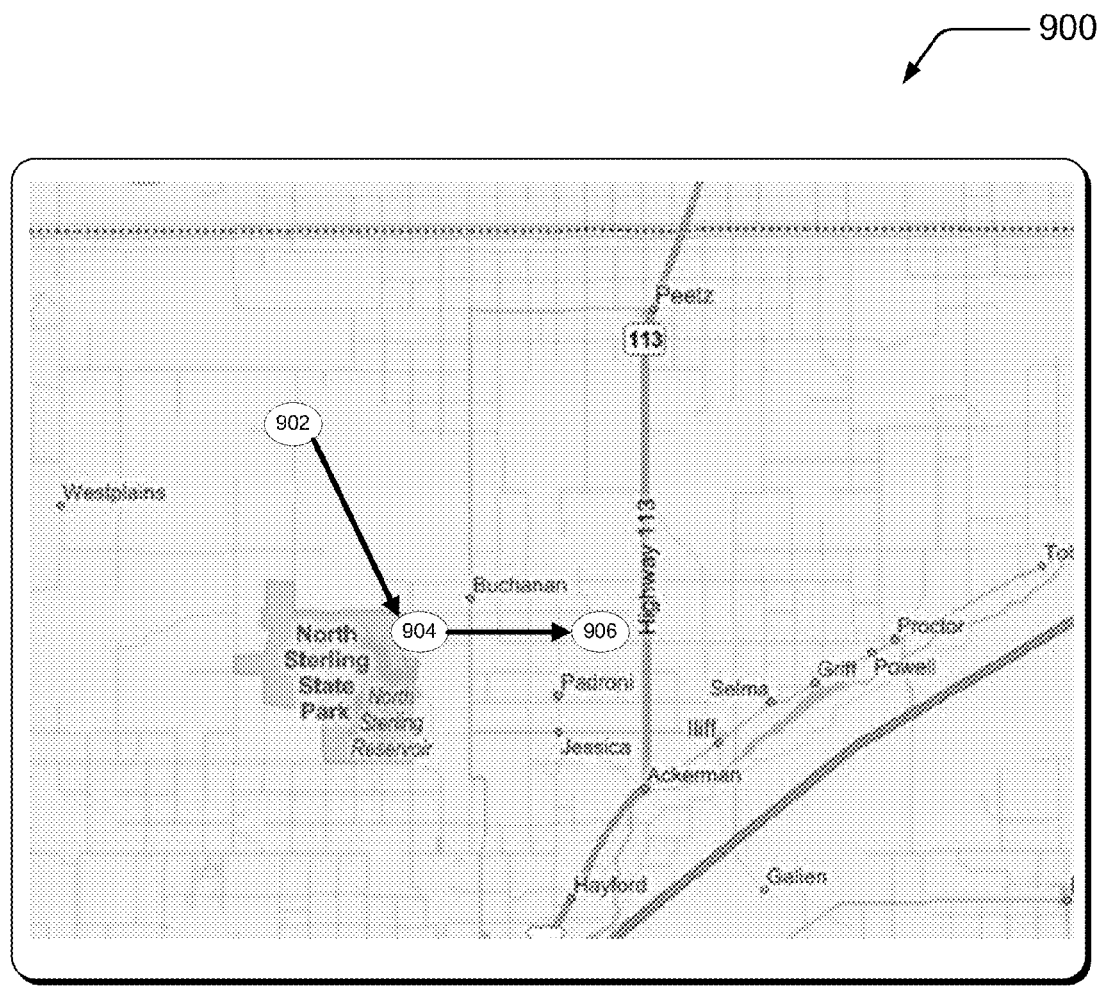
FIGS. 9-10 illustrate example trajectory routes.
Figure 10:
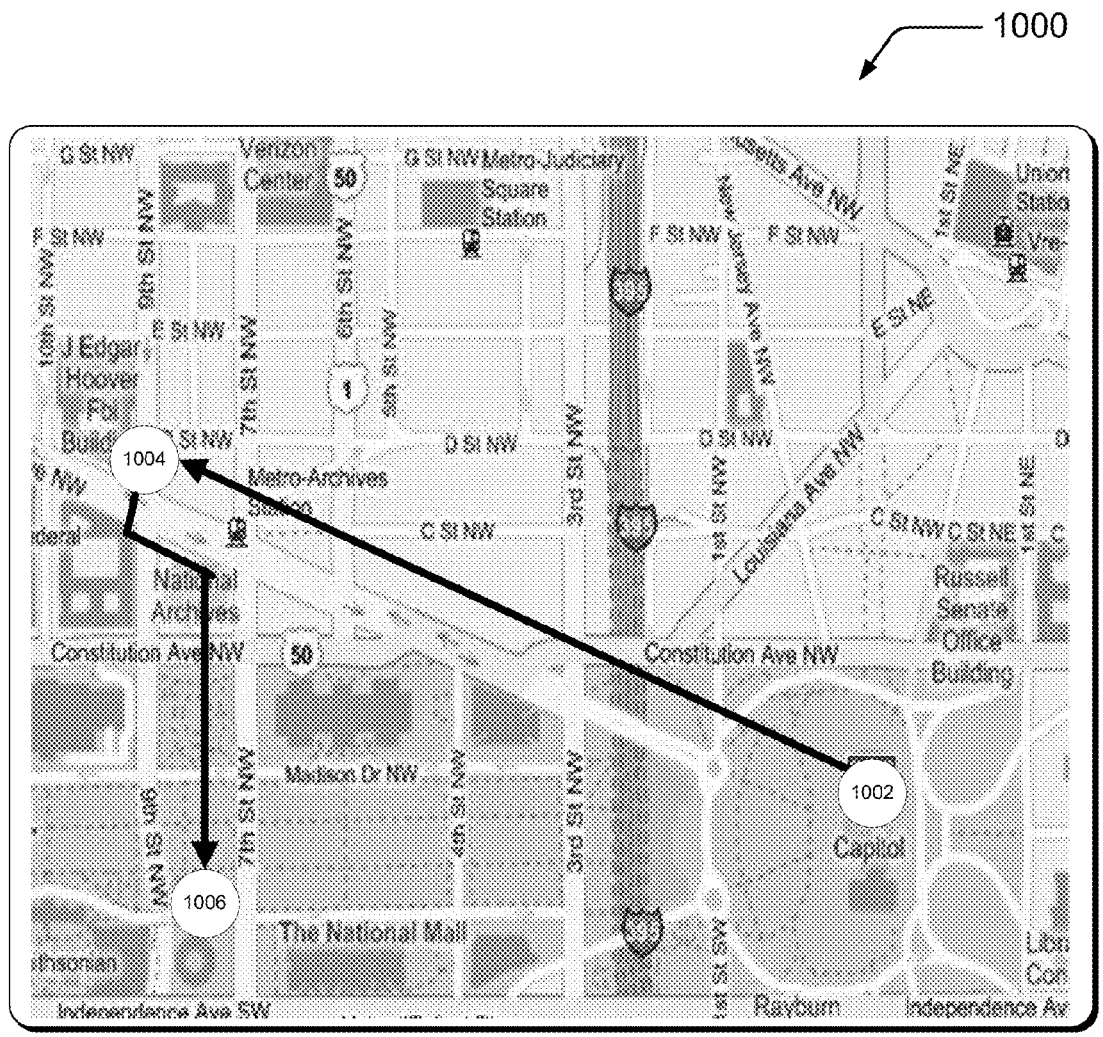

FIGS. 8-10 illustrate an illustrative process 208 of constructing the trajectory route and illustrative trajectory routes. In FIG. 8, the process 208 constructs the trajectory or the travel route that allow the user 108 to travel in the order specified, if requested.

The trajectory route service 106 accesses the trajectory route service 802. A trajectory route map is constructed from global position system (GPS) logs associated with respective individual devices, each of the GPS logs include trajectories that connect a set of geographical locations previously visited by an individual of a respective individual device.

The trajectory route service 106 receives a request from the user 108 for a route to multiple geographical locations of interest 804. The user 108 may enter the request by selecting the multiple geographical locations of interest on the trajectory route map. In another implementation, the user may specify the multiple geographical locations of interest by entering input on the UI 114. As mentioned, the request may be described as a set of geographical locations of interest.

The trajectory route service 106 computes an initial path by identifying trajectories that are closest to each of the multiple geographical locations of interest 806. The trajectory route service 106 refines the initial path by finding the best trajectory 808 from the GPS logs that sequentially connects each of the multiple geographical locations of interest. The refining process was described in FIG. 7. The trajectory route service 106 presents the trajectory route with a travel sequence 810 based at least in part on connecting the multiple geographical locations of interest.

As discussed previously, the user 108 may specify a traveling order. When the order is specified, the trajectory route service 106 marks the travel route to allow the requesting user to view the route and to travel in the order specified 208.

FIG. 9 illustrates an illustrative trajectory route 900 of multiple geographical locations of interest without specifying any particular travel order by the user 108. For example, the user 108 inputs locations of for a "camp site" 902 that is located in Colorado near the vicinity of a town known as Buchanan, "North Sterling State Park" 904 to identify a park area for activities, such as hiking or boating, and "nearest highway" 906 to find a shortest distance route to travel from North Sterling State Park to a road. This travel route may be given by searching the trajectories from the GPS logs being closest in distance to each of the multiple geographical locations of interest 902, 904, and 906.

In an implementation, the trajectory route service 106 accesses a trajectory route model constructed from global positioning system (GPS) trajectories and geographical regions and receives user input to identify multiple geographical locations by the user clicking on a trajectory route map. The trajectory route service 106 computes the initial trajectory path based on a first geographical location to a second geographical location by using the trajectories that are closest in distance to the first and the second geographical locations. The trajectory route service 106 computes a secondary trajectory path based on the second geographical location to a third geographical location by using the trajectories that are closest in distance to the second and the third geographical locations, and refines the initial and the secondary trajectory paths by computing a trajectory route that sequentially connects the initial and the secondary trajectory paths.

The trajectory route service 106 adapts the k-NN algorithm to find the best trajectory with respect to the order of travel specified by the user 108. Using the candidate trajectory $R_x \in C$ that is generated by the k-NN algorithm, some of the trajectory points are scanned by the $\lambda$-NN searches. For a set of scanned points on $R_x$ by $R'_x$, the equation shows:

$$R'_x = \{p_i | p_i \in R_x \wedge p_i \in S\}$$

where $S = \lambda\text{-NN}(q_1) \cup \lambda\text{-NN}(q_2) \cup \ldots \cup \lambda\text{-NN}(q_m)$. The $R'_x$ is a sub-trajectory that includes only a subset of points on $R_x$. The trajectory route service 106 allows $R'_x$, following the order of $R_x$. The equation for order specified similarity function is $\text{Sim}_o(Q, R_x) \geq \text{Sim}_o(Q, R'_x)$. The trajectory route service 106 uses another equation to calculate a new lower bound $LB_o$ of similarity for ordered geographical locations by using a partially retrieved trajectory points of $R_x$. The equation for calculating the $LB_o$ follows:

$$LB_o(R_x) = \text{Sim}_o(Q, R'_x) = DP(Q, R'_x)$$

where $DP(Q, R'_x)$ is calculated using the algorithm shown below.

| Algorithm for Ordered Travel: DP(Q,R) |
|---|
| 1  Matrix M[i,j]; |
| 2  ∀∈ [1,m],M[i,0] ← 0 |

| Algorithm for Ordered Travel: DP(Q,R) |
|---|
| 3  ∀∈ [1,l],M[o,j] ← 0 |
| 4  for i=1 to m do |
| 5    for j=1 to l do |
| 6      if $e^{-Dist_e(Head(Q),Head(R))}$ + M[i − 1,j] > M[i,j − 1] |
|       then |
|       // match $q_i$ with $p_j$ and repeat $p_j$ |
| 7        M[i,j] ← |
|       $e^{-Dist_e(Head(Q),Head(R))}$ + M[i − 1,j] |
| 8      else |
|       // skip $p_j$ |
| 9        M[i,j] ← M[i,j − 1] |
| 10  Return M[m,l] |

The trajectory route service 106 refines the process by calculating the $UB_o$ (for ordered travel) for the candidate trajectories within the candidate set. The equation to use is:

$$UB_o(R_x) = LB_o(R_x) + \sum_{i \in [1,m] \wedge R_x \notin C_i} \{e^{-Dist_e(p_i^\lambda, q_i)}\}$$

where the k-NN algorithm may be adapted to find the best trajectory for the multiple geographical locations when the order of travel is specified by the user.

FIG. 10 illustrates an illustrative route 1000 provided by the trajectory route service 106. The user 108 specifies tourist attractions (e.g., landmark or famous name of attraction) by specifying an order of travel. The multiple locations are identified by landmarks, such as location 1, L1 is "The Capitol" 1002, location 2, L2 is "J. Edgar Hoover FBI Building" 1004, and location 3, L3 is "The National Mall" 1006. These are popular tourist attractions located in Washington, D.C. that a tourist, the user, or an agency could enter as input to receive the travel sequence in this order of locations 1, 2, and 3 (L1, L2, L3) based on the route along one way streets, on a bus route, or part of a travel agency's route.

In an implementation, the trajectory route service 106 receives user input specifying an order of travel for the geographical locations. The order is from first to third to second geographical locations. The trajectory route model provides an initial route based on a sequence of trajectories for the geographical locations. The trajectory route service calculates a new trajectory path based at least in part on using the points on the trajectories that are closest in distance to a first geographical location and a third geographical location. The trajectory route service calculates another new trajectory path based at least in part on the points on the trajectories that are closest in distance to the third and a second geographical locations, and refines the new trajectory and another new trajectory paths by computing the trajectory route based at least in part on the order of travel specified by the user that sequentially connects the first, the third, and the second geographical locations.

Exemplary Server Implementation

Figure 11:
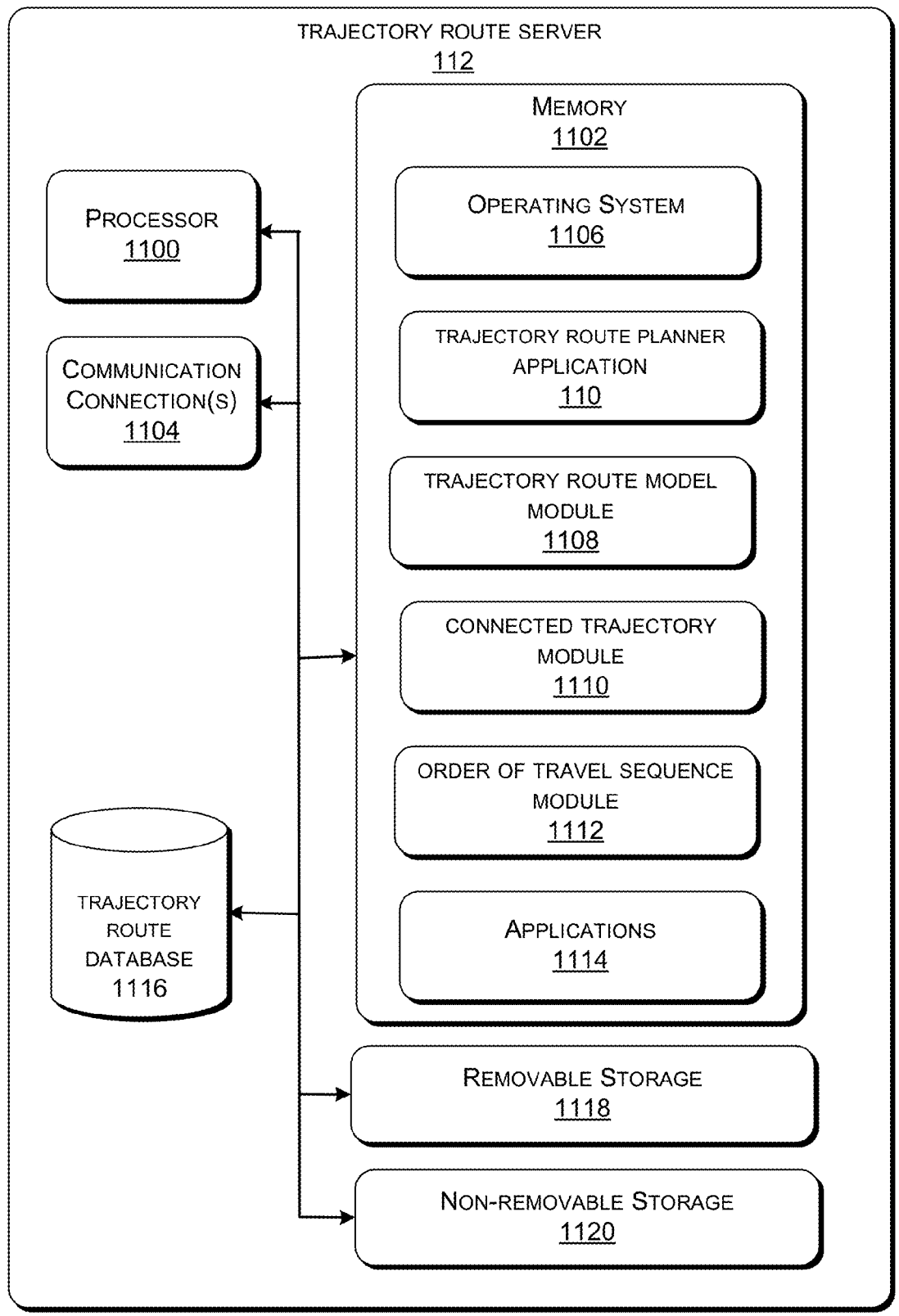
FIG. 11 is a block diagram showing an illustrative server usable with the architecture of FIG. 1.

FIG. 11 is a block diagram showing an illustrative server usable with the environment of FIG. 1. The trajectory route server 112 may be configured as any suitable system capable of services, which includes, but is not limited to, implementing the trajectory route service 106 for online services, such as providing recommendations for the trajectory route, a trip planner, and the like. In one illustrative configuration, the server 112 comprises at least one processor 1100, a memory 1102, and a communication connection(s) 1104.

The communication connection(s) 1104 may include access to a wide area network (WAN) module, a local area network module (e.g., WiFi), a personal area network module (e.g., Bluetooth), and/or any other suitable communication modules to allow the server 112 to communicate over the network(s) 104.

Turning to the contents of the memory 1102 in more detail, the memory 1102 may store an operating system 1106, a module for the trajectory route application 110, a trajectory route model module 1108, a connected trajectory module 1110, and an order travel sequence module 1112. Furthermore, there may be one or more applications 1114 for implementing all or a part of applications and/or services using the trajectory route service 106. The applications 1114 may be for implementing other programs, such as email, voicemail, and the like.

The trajectory route service 106 provides access to the trajectory route application 110. The functions described may be performed by the trajectory route service 106 and/or the trajectory route application 110. The trajectory route service 106 receives the user queries, sends the routes, builds the model, constructs the route, and interacts with the other modules to provide directions with sequence for travel.

The trajectory route application module 110 interacts with the trajectory route service 106. It provides the display of the application on the user interface, interacts with information from the trajectory maps, models, and other modules to provide recommendations for travel.

The trajectory route model module 1108 preprocesses the GPS data (or other location based logs) to identify points on the trajectory of the GPS logs. The process includes collecting or receiving GPS logs, parsing trajectories from the log data, and identifying trajectories that have a proximal similarity to the geographical locations.

The connected trajectory module 1110 determines the trajectories from the GPS logs that are similar to the geographical locations of interest, determines the best trajectory that connects each of the geographical locations, and provides the trajectory route. The connected trajectory module 1110 applies the algorithms described.

The order of travel sequence module 1112 correlates the order of travel specified by the user 108. The order of travel sequence module 1112 identifies the travel sequence by reordering the sequence of travel for the trajectory points based on using the algorithms described above.

The server 112 may include a trajectory route database 1116 to store the collection of GPS logs, trajectories, data for the trajectory route model, and the like.

The server 112 may also include additional removable storage 1118 and/or non-removable storage 1120. Any memory described herein may include volatile memory (such as RAM), nonvolatile memory, removable memory, and/or non-removable memory, implemented in any method or technology for storage of information, such as computer-readable storage media, computer-readable instructions, data structures, applications, program modules, emails, and/or other content. Also, any of the processors described herein may include onboard memory in addition to or instead of the memory shown in the figures. The memory may include storage media such as, but not limited to, random access memory (RAM), read only memory (ROM), flash memory, optical storage, magnetic disk storage or other magnetic storage devices, or any other medium which can be used to store the desired information and which can be accessed by the respective systems and devices.

The server as described above may be implemented in various types of systems or networks. For example, the server may be a part of, including but is not limited to, a client-server system, a peer-to-peer computer network, a distributed network, an enterprise architecture, a local area network, a wide area network, a virtual private network, a storage area network, and the like.

Various instructions, methods, techniques, applications, and modules described herein may be implemented as computer-executable instructions that are executable by one or more computers, servers, or telecommunication devices. Generally, program modules include routines, programs, objects, components, data structures, etc. for performing particular tasks or implementing particular abstract data types. These program modules and the like may be executed as native code or may be downloaded and executed, such as in a virtual machine or other just-in-time compilation execution environment. The functionality of the program modules may be combined or distributed as desired in various implementations. An implementation of these modules and techniques may be stored on or transmitted across some form of computer-readable media.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method implemented at least partially by a processor, the method comprising:
   receiving global position system (GPS) logs from user devices associated with GPS sensors;
   accessing, from a database storing the GPS logs, a first trajectory having a plurality of points, wherein an individual point in the plurality of points identifies a geographic location previously visited by a first user with a first user device of the user devices;
   generating a first user interface to provide functionality for a second user;
   causing the first user interface to be presented to the second user via a display of a second user device of the user devices associated with the second user, the first user interface:
   including a first map illustrating the geographic location, and
   configured to receive input from the second user;
   receiving a set of desired geographical locations from the second user via the first user interface, the first map illustrating at least one location of the set of desired geographical locations;
   receiving a request for a second trajectory associated with the set of desired geographical locations;
   determining that the first trajectory is a candidate trajectory based at least in part on:
   calculating, by the processor, a spatial distance between an individual point of the plurality of points and a desired geographical location of the set of desired geographical locations;
   calculating, by the processor and based at least in part on applying a similarity function to at least the spatial distance, a proximal similarity between the first trajectory and the set of desired geographical locations; and
   determining that the proximal similarity is less than a predetermined threshold;

accessing additional trajectories to create a set of candidate trajectories for determining the second trajectory, wherein the set of candidate trajectories includes the first trajectory;

removing unqualified candidate trajectories from the set of candidate trajectories based at least in part on proximal similarities determined between the set of desired geographical locations and individual unqualified candidate trajectories of the unqualified candidate trajectories, wherein resulting candidate trajectories comprise a refined set of candidate trajectories;

identifying the second trajectory from the refined set of candidate trajectories, wherein the second trajectory is determined based at least in part on a latitude of the desired geographical location determined by a GPS sensor of the first user device, and a longitude of the desired geographical location determined by the GPS sensor;

generating a second user interface to provide functionality for presenting the second trajectory to the second user; and causing the second user interface to be presented to the second user via the display of the second user device, the second user interface including a second map illustrating:
the set of desired geographical locations,
the second trajectory connecting each location of the set of desired geographical locations, and
an ordered travel sequence corresponding to the second trajectory.

2. The method of claim 1, wherein receiving the request for the second trajectory is based at least in part on the second user selecting each of the desired geographical locations of the set of desired geographical locations on the first map.

3. The method of claim 1, wherein the set of desired geographical locations is approximately ten or less geographical locations.

4. The method of claim 1, wherein removing the unqualified candidate trajectories comprises:
computing a lower bound of proximal similarity for individual candidate trajectories in the set of the candidate trajectories;
computing an upper bound of proximal similarity for candidate trajectories that are external to the set of the candidate trajectories; and
removing the unqualified candidate trajectories based at least in part on the lower bound of proximal similarity and the upper bound of proximal similarity.

5. The method of claim 1, wherein identifying the second trajectory is based at least in part on receiving another request specifying an order of travel for the set of desired geographical locations.

6. The method of claim 1, wherein identifying the second trajectory is based at least in part on historical data of a travel sequence of the second user.

7. The method of claim 1, wherein the removing unqualified candidate trajectories from the set of candidate trajectories is further based at least in part on an incremental based k-nearest neighbor analysis.

8. The method of claim 7, wherein removing the unqualified candidate trajectories from the set of candidate trajectories based at least in part on the incremental based k-nearest neighbor analysis comprises:
indexing individual points in individual candidate trajectories of the set of candidate trajectories in a spatial index;
determining that at least one individual point of the individual points associated with an individual candidate trajectory of the set of candidate trajectories in the spatial index is outside of a threshold distance from individual desired geographical locations of the set of desired geographical locations; and
removing the individual candidate trajectory of the set of candidate trajectories.

9. The method of claim 1, wherein identifying the ordered travel sequence is based at least in part on at least one of bus routes, traffic flow patterns on one way streets, or traffic flow.

10. The method of claim 1, wherein the second trajectory is determined based at least in part on a time associated with the first user device being located at the desired geographical location determined by the GPS sensor.

11. The method of claim 1, wherein the second trajectory is determined based at least in part on respective latitudes and longitudes of each geographical location in the set of desired geographical locations, the respective latitudes and longitudes being determined by at least one of the GPS sensors.

12. The method of claim 8, wherein the indexing the individual points in the individual candidate trajectories comprises indexing the individual points in a rectangle-tree (R-tree).

13. A system comprising:
a processor;
a memory coupled to the processor and storing:
a trajectory route application module to receive input specifying a first set of geographical locations of interest to a first user; and
a trajectory route model module to:
receive location-based logs that are received from global position system (GPS) sensors associated with individual user devices;
access individual location-based logs of the location-based logs from a database storing the location-based logs;
generate a first user interface;
cause the first user interface to be displayed via a display of an individual user device of the first user, the first user interface including a first map configured to receive input from the first user;
receive the input specifying the first set of geographical locations from the first user via the first user interface, the first map illustrating at least one location of the first set of geographical locations;
determine trajectories connecting a second set of geographical locations, wherein the second set of geographical locations were previously visited by a second user with an additional user device including a GPS sensor;
determine, based at least in part on a similarity function, a proximal similarity between a first individual geographical location of the first set of geographical locations and a second individual geographical location from the location-based logs, wherein the location-based logs include a latitude of the second individual geographical location determined by the GPS sensor of the additional user device, and a longitude of the second individual geographical location determined by the GPS sensor;
determine a plurality of initial paths, individual initial paths of the plurality of initial paths connecting the first set of geographical locations based at least in part on the proximal similarity;

refine the plurality of initial paths based at least in part on the proximal similarity, the refining comprising:
   arranging coordinates associated with individual geographical locations of the second set of geographical locations into a spatial index;
   based at least in part on the spatial index, creating a candidate set of trajectories from the plurality of initial paths, the candidate set of trajectories including at least the first individual geographical location of the first set of geographical locations; and
   pruning unqualified candidate trajectories from the candidate set of trajectories to form a refined set of candidate trajectories based at least in part on determining that proximal similarities associated with the unqualified candidate trajectories are above a predetermined threshold;
identify a particular trajectory from the refined set of candidate trajectories, wherein the particular trajectory is determined based at least in part on the latitude and the longitude;
generate a second user interface; and
cause the second user interface to be displayed via the display of the individual user device of the first user, the second user interface including a second map illustrating:
   the first set of geographical locations,
   the particular trajectory connecting each location of the first set of geographical locations, and
   an ordered travel sequence corresponding to the particular trajectory.

14. The system of claim 13, wherein the determining the individual initial paths comprises using a k-nearest neighbor (k-NN) algorithm to:
   identify a subset of trajectories from the location-based logs that are closest to a geographical location of the first set of geographical locations based at least in part on searching the location-based logs using a k-nearest neighbor (k-NN) search;
   calculate a lower bound of proximal similarity for a particular trajectory in the subset of trajectories that is closest in distance to the first set of geographical locations; and
   calculate an upper bound of proximal similarity for a particular trajectory in the subset of trajectories that is not identified in the subset of trajectories.

15. The system of claim 13, wherein:
the trajectory route application module is further configured to receive another input specifying an order of travel for the first set of geographical locations; and
the trajectory route application module is further configured to adjust the individual initial paths by connecting the first set of geographical locations based at least in part on the order of travel.

16. The system of claim 13, wherein:
the trajectory route model module is further configured to refine the plurality of initial paths by finding a trajectory from the location-based logs that sequentially connects the geographical locations of the first set of geographical locations; and
the trajectory route model module is further configured to provide the ordered travel sequence by using the trajectories from the location-based logs based at least in part on a highest calculated proximal similarity.

17. One or more computer storage devices storing instructions that, when executed by one or more processors, cause the one or more processors to perform operations comprising:
generating a first user interface;
causing the first user interface to be displayed via a display of an individual user device of a first user, the first user interface including a first map configured to receive input from the first user;
receiving input from the first user, via the first user interface, specifying a first set of geographical locations of interest to a first user, the first map illustrating at least one location of the first set of geographical locations;
accessing location-based logs from a database storing the location-based logs, wherein the location-based logs are received from individual user devices associated with global position system (GPS) sensors and include trajectories connecting a second set of geographical locations previously visited by a second user with an additional user device including a GPS sensor;
computing a path connecting the first set of geographical locations based at least in part on calculating a proximal similarity between a first individual geographical location of the first set of geographical locations and a second individual geographical location of the second set of geographical locations, wherein the location-based logs include a latitude of the second individual geographical location determined the GPS sensor of the additional user device, and a longitude of the second individual geographical location determined by the GPS sensor, the computing comprising:
   indexing GPS location information associated with the second set of geographical locations into a spatial index;
   based at least in part on the indexing, creating a candidate set of trajectories from the location-based logs, the candidate set of trajectories from the location-based logs including at least the first individual geographical location of the first set of geographical locations; and
   pruning unqualified candidate trajectories from the candidate set of trajectories to form a refined set of candidate trajectories based at least in part on determining that proximal similarities associated with the unqualified candidate trajectories are above a predetermined threshold;
identifying a particular trajectory from the refined set of candidate trajectories, wherein the particular trajectory is determined based at least in part on the latitude and the longitude;
generating a second user interface; and
causing the second user interface to be displayed via the display of the individual user device of the first user, the second user interface including a second map illustrating:
   the first set of geographical locations,
   the particular trajectory connecting each location of the first set of geographical locations, and
   an ordered travel sequence corresponding to the particular trajectory.

18. The one or more computer storage devices of claim 17, wherein the computing the path comprises using a k-nearest neighbor (k-NN) algorithm to:
   identify a subset of trajectories from the candidate set that are closest to a geographical location of the first set of geographical locations based at least in part on searching the spatial index using a k-nearest neighbor (k-NN) search;

calculate a lower bound of proximal similarity for a particular trajectory in the subset of trajectories that is closest in distance to the first set of geographical locations; and calculate an upper bound of proximal similarity for a particular trajectory in the subset of trajectories that is not identified in the subset of trajectories.

19. The one or more computer storage devices of claim 17, wherein the operations further comprise:

receiving another input specifying an order of travel for the first set of geographical locations; and adjusting the path by connecting the first set of geographical locations in the order of travel specified by the user.

20. The one or more computer storage devices of claim 17, wherein the operations further comprise:

refining the path by determining a trajectory from the location-based logs that sequentially connects geographical locations included in the first set of geographical locations; and providing a travel route by using the trajectory from the location-based logs based at least in part on a highest calculated proximal similarity.

* * * * *